United States Patent
Wintzer et al.

(10) Patent No.: US 9,447,939 B2
(45) Date of Patent: Sep. 20, 2016

(54) HEADLIGHT LENS

(71) Applicant: DOCTER OPTICS SE, Neustadt an der Orla (DE)

(72) Inventors: Wolfram Wintzer, Jena (DE); Dmitry Fedosik, Lippstadt (DE)

(73) Assignee: Docter Optics SE, Neustadt an der Orla (DE)

( * ) Notice: Subject to any disclaimer, the term of this patent is extended or adjusted under 35 U.S.C. 154(b) by 162 days.

(21) Appl. No.: 14/397,811

(22) PCT Filed: Apr. 18, 2013

(86) PCT No.: PCT/EP2013/001160
§ 371 (c)(1),
(2) Date: Oct. 29, 2014

(87) PCT Pub. No.: WO2013/170923
PCT Pub. Date: Nov. 21, 2013

(65) Prior Publication Data
US 2015/0109810 A1   Apr. 23, 2015

(30) Foreign Application Priority Data

May 15, 2012 (DE) ........................ 10 2012 009 596

(51) Int. Cl.
*F21S 8/10* (2006.01)
*G02B 19/00* (2006.01)
(Continued)

(52) U.S. Cl.
CPC ...... *F21S 48/1225* (2013.01); *B29C 45/14221* (2013.01); *B29C 45/14778* (2013.01);
(Continued)

(58) Field of Classification Search
CPC .................. B29C 45/14221; B29C 45/14778; B29K 2023/00; B29K 2033/12; B29K 2069/00; B29K 2995/0039; B29L 2011/0016; B29L 2031/3055; C03B 2215/49; F21S 48/115; F21S 48/1159; F21S 48/1225; F21S 48/1241; F21S 48/1275; F21S 48/1291; G02B 3/04; G02B 3/08; G02B 19/0014; G02B 19/0066
See application file for complete search history.

(56) References Cited

U.S. PATENT DOCUMENTS 5,257,168 A   10/1993   Davenport et al.
5,697,690 A   12/1997   Okuchi et al.
(Continued)

FOREIGN PATENT DOCUMENTS

DE   1165514   9/1964
DE   4121673   1/1993
(Continued)

OTHER PUBLICATIONS

International Search Report and Written Opinion, Application No. PCT/EP2013/001160, dated Jul. 30, 2013.
(Continued)

*Primary Examiner* — Stephen F Husar
(74) *Attorney, Agent, or Firm* — Barnes & Thornburg LLP

(57) ABSTRACT

A method for producing a vehicle headlamp lens having at least one light entry surface and at least one optically effective light exit surface wherein glass, (for example, in gob and/or liquid form) is blank-pressed between a first mold and at least one second mold to form a one-piece member comprising a first partial light conducting part and a light tunnel, which transitions into the first partial light conducting part by means of a bend. The glass is, for example, drawn into the second mold by means of an under pressure and the first partial light conducting part is at least partially over molded with transparent plastic to form a second partial light conducting part so that the first partial light conducting part and the second partial light conducting part form and/or shape a light conducting part for imaging the bend as a light-shadow line.

24 Claims, 16 Drawing Sheets

(51) Int. Cl.
*G02B 3/04* (2006.01)
*G02B 3/08* (2006.01)
*B29C 45/14* (2006.01)
B29L 11/00 (2006.01)
B29K 23/00 (2006.01)
B29K 33/00 (2006.01)
B29L 31/30 (2006.01)

(52) U.S. Cl.
CPC .......... *F21S48/115* (2013.01); *F21S 48/1159* (2013.01); *F21S 48/1241* (2013.01); *F21S 48/1275* (2013.01); *F21S 48/1291* (2013.01); *G02B 3/04* (2013.01); *G02B 3/08* (2013.01); *G02B 19/0066* (2013.01); *B29K 2023/00* (2013.01); *B29K 2033/12* (2013.01); *B29K 2995/0039* (2013.01); *B29L 2011/0016* (2013.01); *B29L 2031/3055* (2013.01); *C03B 2215/49* (2013.01)

(56) References Cited

U.S. PATENT DOCUMENTS

| | | | |
|---|---|---|---|
| 6,709,141 B1 | 3/2004 | Sisti | |
| 7,073,931 B2 | 7/2006 | Ishida | |
| 8,342,726 B2 | 1/2013 | Fischer et al. | |
| 8,851,722 B2 * | 10/2014 | Fedosik | F21S 48/125 362/507 |
| 8,944,649 B2 * | 2/2015 | Fedosik | F21S 48/1159 362/511 |
| 9,243,769 B2 * | 1/2016 | Fedosik | F21S 48/1159 |
| 2004/0156209 A1 | 8/2004 | Ishida | |
| 2006/0087860 A1 | 4/2006 | Ishida | |
| 2007/0147055 A1 | 6/2007 | Komatsu | |
| 2007/0201241 A1 | 8/2007 | Komatsu | |
| 2009/0296239 A1 | 12/2009 | Shimizu et al. | |
| 2010/0033849 A1 | 2/2010 | Seki et al. | |
| 2010/0271701 A1 | 10/2010 | Lee et al. | |
| 2011/0148280 A1 | 6/2011 | Kishimoto et al. | |
| 2013/0242590 A1 * | 9/2013 | Fedosik | F21S 48/1159 362/521 |

FOREIGN PATENT DOCUMENTS

| | | |
|---|---|---|
| DE | 4209957 | 9/1993 |
| DE | 4320554 | 12/1993 |
| DE | 19526512 | 1/1996 |
| DE | 19742159 | 1/1998 |
| DE | 10252228 | 8/2003 |
| DE | 102004005931 | 8/2004 |
| DE | 10315131 | 10/2004 |
| DE | 20320546 | 4/2005 |
| DE | 202004005936 | 4/2005 |
| DE | 102005009556 | 9/2005 |
| DE | 102004033758 | 2/2006 |
| DE | 102004043706 | 4/2006 |
| DE | 102004048500 | 4/2006 |
| DE | 102005011760 | 9/2006 |
| DE | 102005045197 | 3/2007 |
| DE | 102006044641 | 3/2008 |
| DE | 102008026626 | 12/2009 |
| DE | 10252228 | 1/2010 |
| DE | 102008049168 | 4/2010 |
| DE | 102009008631 | 8/2010 |
| DE | 112008003157 | 1/2012 |
| DE | 102011012727 | 3/2012 |
| EP | 0711949 | 5/1996 |
| EP | 1113216 | 7/2001 |
| EP | 1357334 | 10/2003 |
| EP | 13573333 | 10/2003 |
| EP | 1666787 | 6/2006 |
| EP | 1767398 | 3/2007 |
| EP | 1514148 | 1/2008 |
| EP | 2113222 | 11/2009 |
| EP | 2159479 | 3/2010 |
| EP | 2221219 | 8/2010 |
| FR | 2804494 | 8/2001 |
| FR | 2860280 | 9/2004 |
| GB | 2365962 | 2/2002 |
| GB | 2399622 | 8/2005 |
| GB | 2412159 | 9/2005 |
| JP | 2005317226 | 11/2005 |
| WO | 2004007241 | 1/2004 |
| WO | 2007095895 | 8/2007 |
| WO | 2009109209 | 9/2009 |
| WO | 2009147070 | 12/2009 |
| WO | 2012072193 | 6/2012 |

OTHER PUBLICATIONS

PCT International Search Report and Written Opinion completed by the ISA/EP on Aug. 3, 2012 and issued in connection with PCT/EP2012/002077.
International Preliminary Report on Patentability (Chapter I) issued on Jun. 4, 2013 in connection with PCT/EP2011/005698.
International Preliminary Report on Patentability (Chapter I) issued on Jun. 4, 2013 in connection with PCT/EP2011/005699.
International Preliminary Report on Patentability (Chapter I) issued on Jun. 4, 2013 in connection with PCT/EP2011/005700.
International Preliminary Report on Patentability (Chapter I) issued on Jun. 4, 2013 in connection with PCT/EP2011/005701.
International Preliminary Report on Patentability (Chapter I) issued on Jun. 4, 2013 in connection with PCT/EP2011/005702.
International Preliminary Report on Patentability (Chapter I) issued on Jun. 4, 2013 in connection with PCT/EP2011/005703.
PCT International Search Report completed by the ISA/EP Mar. 19, 2012 and issued in connection with PCT/EP2011/005699.
PCT International Search Report completed by the ISA/EP Feb. 15, 2012 and issued in connection with PCT/EP2011/005700.
PCT International Search Report completed by the ISA/EP Feb. 1, 2012 and issued in connection with PCT/EP2011/005701.
PCT International Search Report completed by the ISA/EP May 9, 2012 and issued in connection with PCT/EP2011/005702.
PCT International Search Report completed by the ISA/EP May 4, 2012 and issued in connection with PCT/EP2011/005703.
Takahashi, et al. "Laser Headlight" for Next Generation Automotive Lighting. ISAL-2011 Proceedings pp. 271-283.
PCT International Search Report completed by the ISA/EP Feb. 1, 2012 and issued in connection with PCT/EP2011/005698.

* cited by examiner

HEADLIGHT LENS

CROSS REFERENCE TO RELATED APPLICATIONS

This application is a U.S. nationalization under 35 U.S.C. §371 of International Application No. PCT/EP2013/001160, filed Apr. 18, 2013, which claims priority to German Application No. 102012009596.1, filed May 15, 2012.

FIELD OF THE INVENTION

The invention also relates to a headlight lens, including at least one light tunnel and at least one light passage section.

BACKGROUND INFORMATION

DE 10 2004 043 706 A1 discloses an optical system for a motor vehicle headlight for dispersing a beam of light rays of an illuminant, with an optical primary element having an optical face including a break or discontinuity and extending along a line, being provided, wherein the optical face is configured to be smooth at least on one side adjacent the discontinuity so that the beam of light rays is separated into two partial beams of light rays. Herein, it is provided that at least one of the partial beams of light rays has a sharp boundary edge. Moreover, the optical system comprises an optical secondary element for imaging the sharp boundary edge onto a predetermined bright (also known as "light-")-dark-boundary.

EP 1 357 333 A2 discloses a light source device for a vehicle light which has an element irradiating semiconductor light, which element is arranged on an optical axis of the light source device and irradiates its light essentially in an orthogonal direction with regard to the optical axis.

DE 195 26 512 A1 discloses an illumination device for vehicles, wherein a light conductor of light-transmissive material having a predetermined light refractory index is arranged between the light exit end of an optical lead and a light entry end of a lens body. Herein, the light conductor is configured such that it covers the total surface of the exit light end of the optical lead and has a light exit face which is configured such that it is suited for forming an illumination pattern.

DE 102 52 228 A1 discloses a headlight for a motor vehicles including a light source as well as a light termination body associated with the light source and having a light entry face for making light irradiated from the light source enter, and a light exit face as well as a lens which cooperates with the light exit face and is arranged in the light irradiating direction following the light termination body.

Further illumination means in context with vehicles are disclosed by DE 42 09 957 A1, DE 41 21 673 A1, DE 43 20 554 A1, DE 10 2009 008 631 A1, U.S. Pat. No. 5,257,168, DE 103 15 131 A1, DE 20 2004 005 936, DE 203 20 546 U1, DE 10 2004 048 500 A1, and U.S. Pat. No. 5,697,690.

It is, for example, an object of the invention to suggest an improved headlight lens for a vehicle headlight, for example for a motor vehicle headlight. It is a further object of the invention to reduce the costs for manufacturing vehicle headlights. It is a further object of the invention to reduce the costs for manufacturing vehicles. It is a still further object of the invention to suggest a vehicle having particularly compact dimmed headlights.

SUMMARY

The aforementioned object is achieved by a headlight lens for a vehicle headlight, for example for motor vehicle headlight, including at least one (for example optically operative) light entry face and e.g. at least one optically operative light exit face, wherein the headlight lens comprises a light tunnel, which, via a bend, forms transition into a first partial light passage section of a light passage section for imaging the bend as a bright-dark-boundary, wherein the light tunnel and the first partial light passage section of the light passage section form a for example blank-molded, monolithic body of glass or are part of a for example blank-molded, monolithic body, and wherein the light passage section includes at least one second partial light passage section of transparent, for example amorphous, plastic, which section at least partially encloses the first partial light passage section and/or is fixedly connected to the first partial light passage section.

Herein, it is, in particular, provided for that the first partial light passage section is injection molded around by the second partial light passage section or that the second partial light passage section is added by injection-molding to the first partial light passage section. It is, in particular, provided for that the glass part or element is not injection-molded around in the area of the bend or is not enclosed, respectively.

In a suitable process for manufacturing the aforementioned headlight lens, at first, a glass part or element (glass body) is blank-molded, in particular from hot gob or from the molten mass, particularly under complete mold contact, which glass part comprises the light tunnel and the first partial light passage section. Subsequently, the glass part is cooled-down and is then injection-molded around by transparent plastic material for forming the second partial light passage section or, respectively, transparent plastic material is then added-on to the first partial light passage section by injection molding for forming the second partial light passage section.

It is, for example, provided for that the glass part, body, or element has a coating as it has been disclosed in DE 11 2007 000 189 A5, for example. Such a coating is, in particular, brought about before the injection molding-around takes place. It is, for example, provided for that the coating comprises a concentration of aluminum, which is larger than a concentration of aluminum in the interior of the glass part, and/or than a concentration of sodium which is smaller than a concentration of sodium in the interior of the glass part. It is, for example, provided for that the glass part, body, or element externally (on its surface) comprises a concentration of aluminum which is larger than a concentration of aluminum in the interior of the glass part, and/or a concentration of sodium which is smaller than a concentration of sodium in the interior of the glass part/body. It is, for example, provided for that during cooling down the glass part/body is (over) floated by gas containing sulfur, chlorine, fluor, iron and/or aluminum, wherein the gas, for example, comprises HCl or $CF_4$ or $AlCl_3$ An optically operative (or effective) light entry (sur)face and/or an optically operative light exit (sur)face, respectively, is an optically effective face. An optically effective (sur)face is, in particular, a (sur)face of the transparent body, at which face, when using the headlight lens according to its purpose, light will be refracted. An optically operative face is, in particular, a face at which, when using the headlight lens according to its purpose, the direction of light which passes through this face will be changed.

Glass is particularly inorganic glass or silicate glass. Glass is for example glass as described in Document PCT/EP2008/010136. Glass for example comprises 0.2 to 2% by weight $Al_2O_3$,
0.1 to 1% by weight $Li_2O$,
0.3 (in particular 0.4) to 1.5% by weight $Sb_2O_3$,
60 to 75% by weight $SiO_2$,
3 to 12% by weight $Na_2O$,
3 to 12% by weight $K_2O$, and
3 to 12% by weight CaO.

Herein, the term blank-molding is, in particular, to be understood in a manner that an optically operative face is to be (injection) molded under pressure such that any subsequent finishing or post-treatment of the contour of this optically operative face may be dispensed with or does not apply or will not have to be provided for, respectively. Consequently, it is particularly provided for that, after blank-molding, the light exit face is not ground, i.e. it will not (have to) be treated by grinding.

A light tunnel is, in particular, characterized in that essentially total reflection takes place by/at its lateral (in particular top, bottom, right and/or left) surfaces, so that light entering the light entry face is conducted through the tunnel as a light guide (conductor). A light tunnel is for example a light guide or light conductor. It is, for example, provided for that total reflection is achieved at the longitudinal surfaces of the light tunnel. It is, for example, provided for that the longitudinal surfaces of the light tunnel are adapted for total reflection. It is, for example, provided for that total reflection is achieved by/at the surfaces of the light tunnel essentially oriented in the direction of the optical axis of the light tunnel. It is, for example, provided for that the surfaces of the light tunnel essentially oriented in the direction of the optical axis of the light tunnel are provided for total reflection. A light tunnel, for example, tapers in the direction of its light entry face. A light tunnel, for example, tapers in the direction of its light entry face by at least 3°. A light tunnel, for example, tapers in the direction of its light entry face by at least 3° with respect to its optical axis. A light tunnel, tapers for example, at least partially in the direction of its light entry face. A light tunnel, e.g., tapers at least partially in the direction of its light entry face by at least 3°. A light tunnel, tapers for example, at least partially in the direction of its light entry face by at least 3° with respect to its optical axis.

A bend is, in particular, a curved transition. A bend is, for example, a curved transition having a radius of curvature of no less than 50 nm. It is, for example, provided for that the surface of the headlight lens has no break or discontinuity in the bend, but rather a curve or curvature. It is, for example, provided for that the surface of the headlight lens in the bend has a curvature, for example, with a radius of curvature of the curve in the bend of no less than 50 nm. In an embodiment the radius of curvature is no larger than 5 mm. In an expedient embodiment the radius of curvature is no more than 0.25 mm, for example, no more than 0.15 mm, for example no more than 0.1 mm. In a further embodiment the radius of curvature of the curve in the bend is at least 0.05 mm. It is, for example, provided for that the surface of the headlight lens is blank-molded in the region of the bend. The bend is, for example, suited for being imaged by means of light as a bright-dark-boundary, which light is made to enter or to be irradiated into the light entry face.

In a further embodiment the first partial light passage section includes a bulge embedded in the second partial light passage section. In the sense of the invention, a bulge (convexity) is, for example, a flange or bead, for example a circumferential flange or bead.

In a further embodiment the first partial light passage section includes a curved boundary (sur)face or interface towards the second partial light passage section, the curvature being for example convex or configured according to a free shape, respectively. In a further embodiment the first partial light passage section includes a curved, optically operative boundary (sur)face or interface towards the second partial light passage section, the curvature being for example convex or configured according to a free shape, respectively. An optically operative boundary face is, for example, a boundary face at which light reflection will occur when the headlight lens is being used according to its purpose. An optically operative boundary face is, for example, a boundary face at which the direction of light, which passes through this boundary face will be changed when the headlight lens is being used according to its purpose.

In a further embodiment the light entry face is associated with the light tunnel or it is part of the light tunnel, respectively. In a further embodiment the light exit face is associated with the light passage section or with the second light passage section or it is part of the second partial light passage section, respectively. In a further embodiment the light tunnel is arranged between the bend and the light entry face. In a further embodiment the light passage section is arranged between the bend and the light entry face. It is, for example, provided for that light entering the headlight lens through the light entry face and entering the passage section in the region of the bend from the light tunnel will exit from the light exit face at an angle of between −20° and 20° with respect to the optical axis. It is, for example, provided for that light entering the headlight lens through the light entry face will exit from the light exit face at an angle of between −20° and 20° relative to the optical axis. It is, for example, provided for that light entering the headlight lens through the light entry face and, from the light tunnel, entering the passage section in the area of the bend, will exit from the light exit face essentially in parallel relative to the optical axis. It is, for example, provided for that light entering the headlight lens through the light entry face, will exit from the light exit face essentially in parallel relative to the optical axis.

In a further embodiment the bend includes an opening angle of at least 90°. In a further expedient embodiment the bend includes an opening angle of no more than 150°. In a further favourable embodiment the bend is arranged on a surface of the light passage section, which surface is facing the light entry (sur)face.

In a further embodiment the orthogonal of the light entry face is inclined with respect to the optical axis of the light passage section. In a further expedient embodiment the light entry face is inclined with respect to the optical axis of the light passage section at an angle of between 5° and 70°, for example at an angle of between 20° and 50°.

In a further embodiment the light tunnel comprises a region on its surface, which region essentially corresponds to a part of the surface of an ellipsoid. In a further expedient embodiment the light tunnel comprises a region on its surface which region corresponds essentially to at least 15% of the surface of an ellipsoid.

In a further embodiment the light tunnel comprises a region on its surface, for which the following applies:

$$0.,75 \cdot a \cdot \sqrt{1 - \frac{y^2}{b^2} - \frac{z^2}{c^2}} \leq x \leq 1.25 \cdot a \cdot \sqrt{1 - \frac{y^2}{b^2} - \frac{z^2}{c^2}}$$

-continued $$0.75 \cdot b \cdot \sqrt{1 - \frac{x^2}{a^2} - \frac{z^2}{c^2}} \leq y \leq 1.25 \cdot b \cdot \sqrt{1 - \frac{x^2}{a^2} - \frac{z^2}{c^2}},$$

in which
- z is a coordinate in the direction (of the optical axis) of the light tunnel,
- x is a coordinate orthogonal to the direction of the optical axis of the light tunnel,
- y is a coordinate orthogonal to the direction of the optical axis of the light tunnel,
- a is a number having a value greater than 0;
- b is a number having a value greater than 0; and
- c is a number having a value greater than 0.

In a further embodiment a surface of the light passage section facing the light tunnel is curved at least in the region of the bend towards the transition into the light tunnel, the curvature being, for example, convex. In a further embodiment the bend is curved in its longitudinal extension. In a further embodiment the bend is curved, in its longitudinal extension, having a radius of curvature of between 5 mm and 100 mm. In a further embodiment the bend is curved, in its longitudinal extension, corresponding to a Petzval curve (also termed Petzval [sur]face).

In a further expedient embodiment the bend comprises, in its longitudinal extension, a curvature having a radius of curvature in the orientation of the optical axis of the light tunnel and/or of the light passage section. In a further embodiment the radius of curvature is orientated opposite to the light exit face.

In a further embodiment the bend is curved in a first direction and in a second direction. In a further expedient embodiment the first direction is orthogonal to the second direction. In a further embodiment the bend is curved with a first radius of curvature in a first direction and with a second radius of curvature in a second direction, wherein the second radius of curvature is positioned orthogonal to the first radius of curvature.

In a further embodiment a portion of the surface of the passage section facing the light tunnel is configured as a Petzval face. In a further embodiment the surface of the light passage section facing the light tunnel is, in a region in which it forms a transition into the light tunnel, configured as a Petzval face.

In a further embodiment the length of the headlight lens, when looked at in the orientation of the optical axis of the light tunnel and/or the light passage section, amounts to no more than 7 cm.

In a further embodiment the headlight lens or the light passage section or the second partial light passage section, respectively, has a further light exit face as well as a further light entry face. In a further expedient embodiment at least 20% of the light entering the light entry face and exiting through the light exit face will exit through the light exit face after having exited from the headlight lens through the further light exit face and after having entered the headlight lens through the further light entry face. In a further embodiment at least 10%, for example at least 20% of the light entering the light entry face and exiting through the light exit face will exit through the light exit face without having exited from the headlight lens through the further light exit face and without having entered the headlight lens through the further light entry face. In a further expedient embodiment at least 75% of the light entering the light entry face and exiting through the light exit face will exit through the light exit face after having exited from the headlight lens through the further light exit face and after having entered the headlight lens through the further light entry face. In a further embodiment it is provided for that light which enters the headlight lens through the light entry face and enters the passage section from the light tunnel in the region of the bend will either exit from the headlight lens from the further light exit face and enter the further light entry face of the headlight lens as well as it will exit from the headlight lens from the light exit face, or it will exit directly from the light exit face (without exiting from the headlight lens through the further light exit face and without entering the further light entry face of the headlight lens).

The aforementioned object is moreover achieved by a vehicle headlight, for example a motor vehicle headlight, wherein the vehicle headlight includes a headlight lens comprising one or several of the aforementioned features as well as a light source for making light enter the light entry face. In an embodiment the light source includes at least one LED or an array of LEDs. In an expedient embodiment the light source comprises at least one OLED or an array of OLEDs. For example, the light source may well be a plane/planar luminous field. The light source may also include light element chips as have been disclosed in DE 103 15 131 A1. A light source may as well be a laser. A suitable laser is disclosed in ISAL 2011 Proceedings, page 271ff.

In a further expedient embodiment the vehicle headlight has no secondary optic associated with the headlight lens. A secondary optic is, in particular, an optic means for aligning light which exits from the light exit face or from the last light exit face, respectively. A secondary optic is in particular an optical element for aligning light separated from and/or subordinated with regard to the headlight lens. A secondary optic is in particular no cover or protection disc, respectively, but an optical element provided for aligning light. An example of a secondary optic is e.g. a secondary lens as has been disclosed in DE 10 2004 043 706 A1.

In particular, it is provided for that the bend which is imaged as bright-dark-boundary lies in the lower region of the light tunnel.

In a further embodiment the distance of the light source from the centre of the first light exit face, when seen in the orientation of the optical axis of the light tunnel and/or the light passage section amounts to no more than 10 cm. In a further embodiment the length of the vehicle headlight, when seen in the orientation of the optical axis of the first light tunnel and/or the light passage section amounts to no more than 10 cm.

One or several further light sources may be provided for whose light is made to enter or irradiate into, respectively, the passage section and/or a part of the light tunnel for implementing signlight, high-beam headlight and/or curving light. For making such additional light enter the light tunnel, it is, in particular, provided for that this is performed in that half of the light tunnel which is closer to the light passage section and/or in which the light entry face is not provided.

The aforementioned object is, moreover, achieved by a method for manufacturing a headlight lens—for example comprising one or several of the aforementioned features—including at least one light entry face and at least one optically operative light exit face, wherein glass (for example from the melting/molten mass or in a liquid state, respectively) is blank-molded between a first mold and at least a second mold to form a monolithic body (in particular under complete contact of the molds), which body comprises a first partial light passage section and a light tunnel which, by way of a bend, forms transition into the first partial light passage section, wherein it is for example provided for that the glass is drawn into the second mold by means of depression (under pressure), and wherein, for forming a second partial light passage section, the first partial light passage section is at least partially injection-added or injection-surrounded such by transparent plastic that the first partial light passage section and the second partial light passage section configure or form, respectively, a light passage section for imaging the bend as a bright-dark-boundary. In an expedient embodiment of the invention, the depression amounts to at least 0.5 bar. In a further embodiment of the invention, the depression corresponds, for example, to vacuum. In a further expedient embodiment the glass, immediately before molding, has a viscosity of no more than $10^{4.5}$ dPas.

The aforementioned object is, moreover, achieved by a headlight lens for a vehicle headlight, for example for a motor vehicle headlight, said headlight lens including at least one optically operative light exit face and at least one optically operative second light exit face, wherein the headlight lens comprises a first light tunnel with a first light entry face, which light tunnel, via a first bend, forms transition into a first partial light passage section of a light passage section, for imaging the first bend as a bright-dark-boundary, wherein the headlight lens comprises a second light tunnel with at least one second light entry face, which second light tunnel, via a second bend, forms transition into a second partial light passage section of the light passage section, for imaging the second bend as a bright-dark-boundary, wherein the first light tunnel and the first partial light passage section of the light passage section form a for example blank-molded, monolithic body of glass (first glass part, element, or body) or are part of an for example blank-molded, monolithic body of glass, wherein the second light tunnel and the second partial light passage section of the light passage section form a for example blank-molded, monolithic body of glass (second glass part, element, or body) or are part of an for example blank-molded, monolithic body of glass, and wherein the light passage section includes at least one third partial light passage section of transparent, for example amorphous, plastic material, which third partial light passage section encloses the first partial light passage section and the second partial light passage section at least partially and/or is fixedly connected to the first partial light passage section and the second partial light passage section. The light entry faces, the light exit faces, the light tunnel and the bends may be configured for example corresponding to the aforementioned embodiments. It is, for example, provided for that the first and the second partial light passage sections are injection molded-around by the third partial light passage section or that the third partial light passage section is added-on by injection molding to the first partial light passage section and/or to the second partial light passage section. It is, for example, provided for that the glass parts (elements, bodies), in the region of the bend, are not injection molded-around, or are not enclosed, respectively.

In an embodiment the first partial light passage section has a boundary face towards the third partial light passage section, which boundary face is curved, for example, convexly or according to a free shape, respectively. In a further embodiment the first partial light passage section has a an optically operative boundary face towards the third partial light passage section, which boundary face is curved, for example convexly or according to a free shape, respectively.

In a further embodiment the second partial light passage section has a boundary face towards the third partial light passage section, which boundary face is curved, for example, convexly or according to a free shape, respectively. In a further embodiment the second partial light passage section has an optically operative boundary face towards the third partial light passage section, which boundary face is curved, for example convexly or according to a free shape, respectively.

In an appropriate process for manufacturing the aforementioned headlight lens, at first, for example taken from the molten mass, and, in particular, under complete mold contact, a first glass part (glass body) is blank-molded, which comprises the first light tunnel and the first partial light passage section, as well as a second glass part (glass body) is blank-molded, which comprises the second light tunnel and the second partial light passage section. Subsequently, both glass parts are cooled-down and are then mutually injection molded-around, or enclosed by transparent plastic material for forming the third partial light passage section. It may also be provided for that transparent plastic material is added-on by injection molding (or cast-on) to the first partial light passage section and to the second partial light passage section.

It is, for example, provided for that the glass parts (bodies or elements) have coatings as it has been disclosed in DE 11 2007 000 189 A5, for example. Such a coating is, for example, brought about before the injection molding-around takes place. It is, for example, provided for that the coating comprises a concentration of aluminum which is larger than a concentration of aluminum in the interior of the glass parts, and/or than a concentration of sodium which is smaller than a concentration of sodium in the interior of the glass parts. It is, for example, provided for that the glass parts or elements externally (on their surfaces) comprise a concentration of aluminum which is larger than a concentration of aluminum in the interior of the glass parts, and/or a concentration of sodium which is smaller than a concentration of sodium in the interior of the glass parts. It is, for example, provided for that during cooling-down the glass parts are (over)floated by gas containing sulfur, chlorine, fluor, iron and/or aluminum, wherein the gas, for example, comprises HCl or $CF_4$ or $AlCl_3$

DETAILED DESCRIPTION

Figure 1:
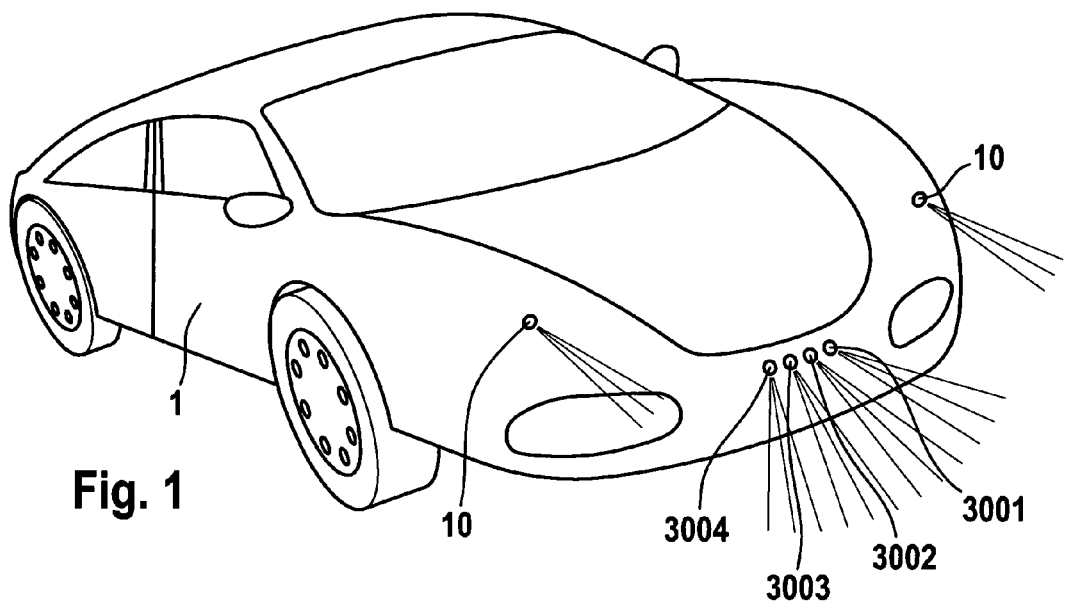
FIG. 1 an example of an embodiment of a motor vehicle.

FIG. 1 shows an example of embodiment of a motor vehicle 1 having motor vehicle headlights 10 and motor vehicle headlights/partial headlights 3001, 3002, 3003, and 3004, which are integrated in the body of the motor vehicle 1 within the central third of the front of the motor vehicle 1. The motor vehicle headlights 10 are, for example, integrated in the body of the motor vehicle 1 within the marginal area of the front of the motor vehicle 1.

Figure 2:
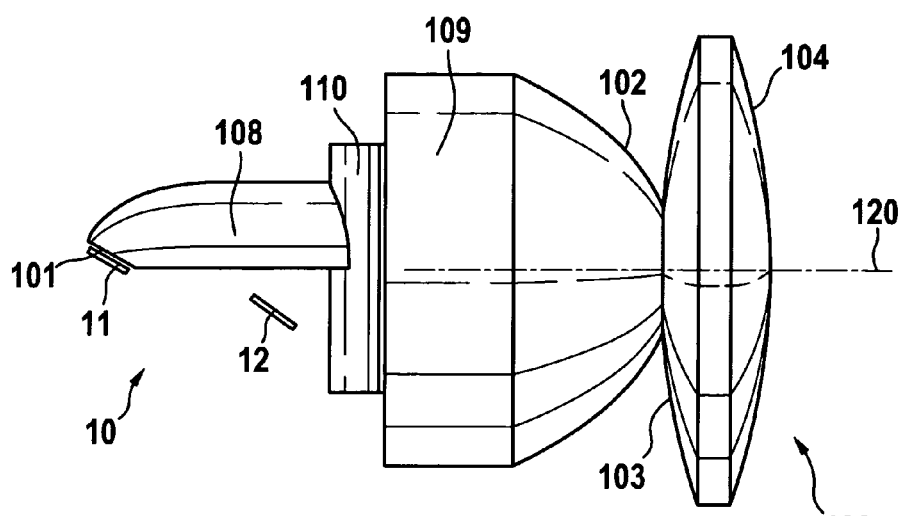
FIG. 2 shows an example of an embodiment of a headlight lens for implementation in the motor vehicle according to FIG. 1.
Figure 3:
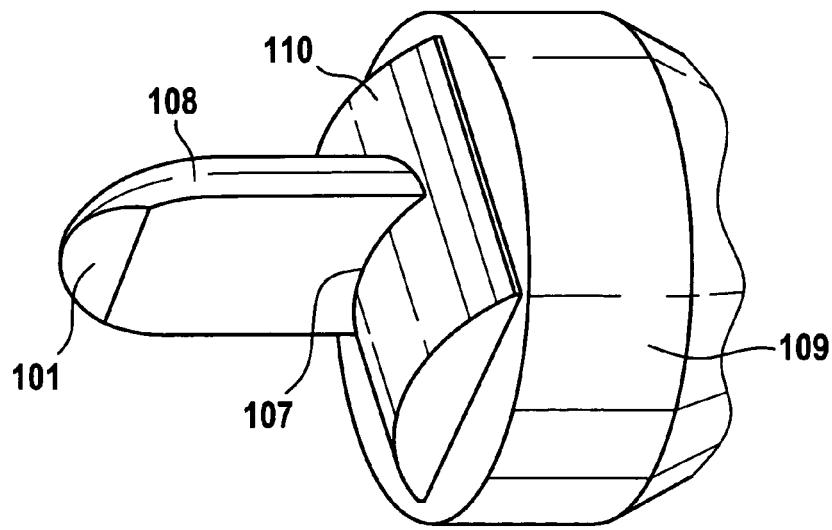
FIG. 3 shows a cut-out representation of a headlight lens of the motor vehicle headlight lens according to FIG. 2 by way of a perspective view from below.

FIG. 2 shows a side view of the motor vehicle headlight 10 including a headlight lens 100, but without any housing, fittings and energy supply, with the headlight lens 100 being represented in FIG. 3 in a cut-out manner by way of a perspective bottom view (view from below). The headlight lens 100 comprises a light tunnel 108, which, on its one side, has a light entry face 101 and, on another side, passes/transits into a light passage (or conductive) section 109 (of the headlight lens) via a bend 107 curved in two spatial directions, which section 109 has a light exit face 102, a light entry face 103 as well as a further light exit face 104. The headlight lens 100 is configured such that light entering the headlight lens 100 through the light entry face 101 and, in the region of the bend 107 entering the passage section from the light tunnel 108, will exit from the light exit face 104 essentially in parallel to the optical axis 120 of the headlight lens 100. Herein, the light passage section 109 images the bend 107 as a bright (or light)-dark boundary. A portion of the surface of the light passage section 109 facing the light tunnel 108 is configured as a Petzval surface, said surface portion having been designated by reference numeral 110.

Figure 4:
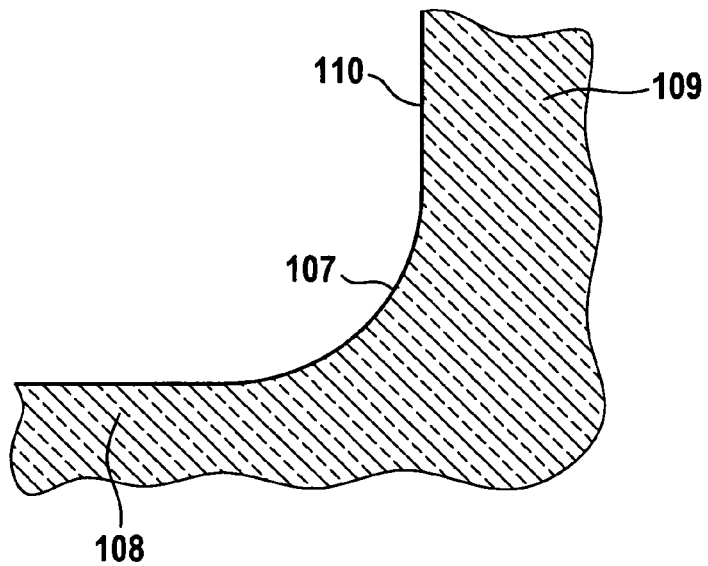
FIG. 4 shows an enlarged representation of a cut-out cross section of a bend for the transition of a light tunnel into a passage section of a headlight lens according to FIG. 3.

FIG. 4 shows, by way of an enlarged representation, a cut-out of the bend 107 for transition of the light tunnel 108 into the light passage section 109, the bend 107 being formed by blank-molding and configured as a continuous, curved transition having a radius of curvature of at least 0.15 mm.

Figure 5:
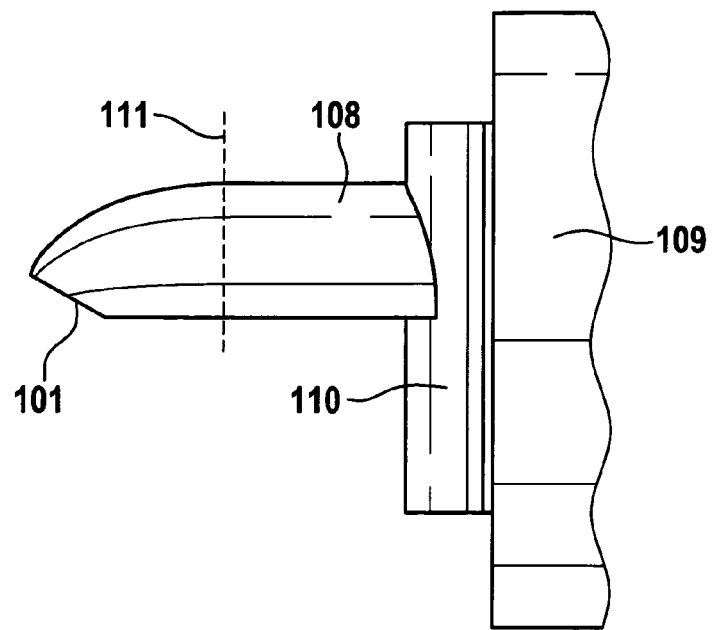
FIG. 5 shows a cut-out representation of a headlight lens according to FIG. 3 by way of a side view.
Figure 6:
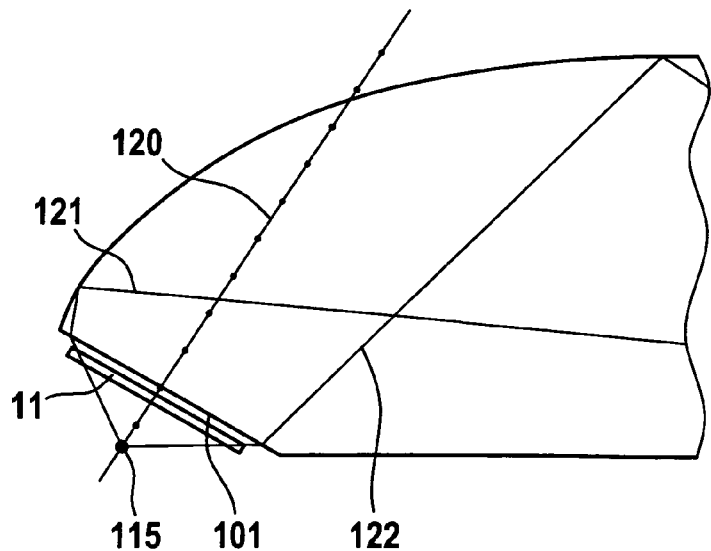
FIG. 6 shows a cut-out representation of a light tunnel of the headlight lens of FIG. 3 by way of a side view.
Figure 7:
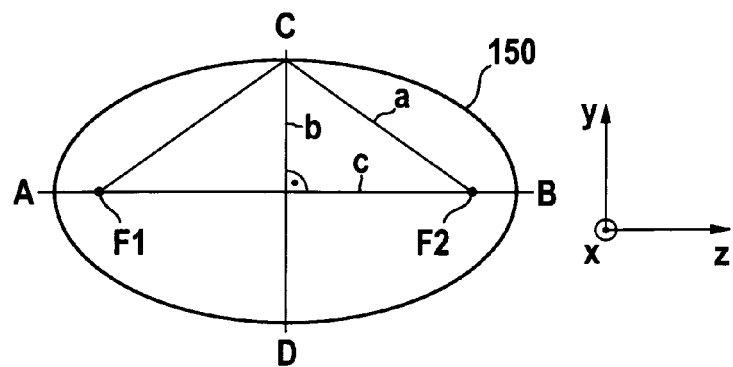
FIG. 7 shows an example of embodiment of an ellipsoid.
Figure 8:
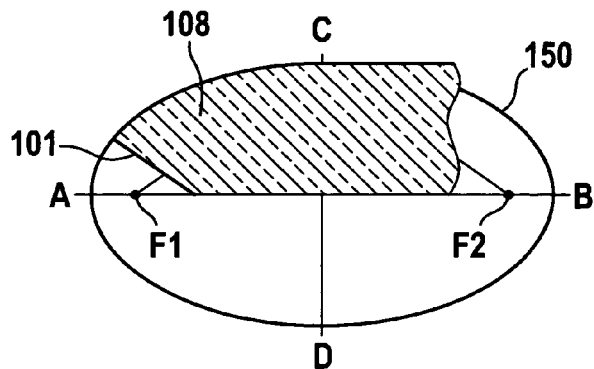
FIG. 8 shows the ellipsoid according to FIG. 7 with a superimposing representation of a portion of the light tunnel represented in FIG. 6 by way of a cross sectional representation.

FIG. 5 shows a cut-out representation of a side view of the headlight lens 100. FIG. 6 shows an enlarged cut-out representation of a part of the light tunnel 108 up to the dotted line in FIG. 5 designated by reference numeral 111. The upper portion of the part of the light tunnel as shown in FIG. 6 has been configured as an ellipsoid 150 as represented in FIG. 7. Herein, the dotted line 111 approximately corresponds to the axis C-D. For clarifying this embodiment, a part of the cross section of the light tunnel 108 is shown in FIG. 8 in a manner superimposing (overlaying) the representation of the ellipsoid 150. For the ellipsoid 150 as represented in FIG. 7 the following equation applies:

$$\frac{x^2}{a^2} + \frac{y^2}{b^2} + \frac{z^2}{c^2} - 1 = 0$$

In this equation
z is a coordinate in the direction of the optical axis of the light tunnel (AB);
x is a coordinate orthogonal with respect to the direction of the optical axis of the light tunnel; and
y is a coordinate orthogonal with respect to the direction of the optical axis of the light tunnel and to the x-direction (DC).

a, b and, consequently, c have been chosen such that all light beams or rays which pass through focus F1 will concentrate again in focus F2 after mirroring in the surface of the ellipsoid. The course of the beams of light from the light source 11, which is irradiated into or made to enter the light entry face 101 is made clear by the light beams 121 and 122 depicted in FIG. 6. Reference numeral 120 of FIG. 6 designates the orthogonal of the light entry face 101. The mutual point of intersection of the orthogonal 120 of the light entry face 101 with the light beams 121 and 122 has been designated by reference numeral 115. The position of this point of intersection 115 corresponds to focus F1 in FIG. 7 and FIG. 8.

Figure 9:
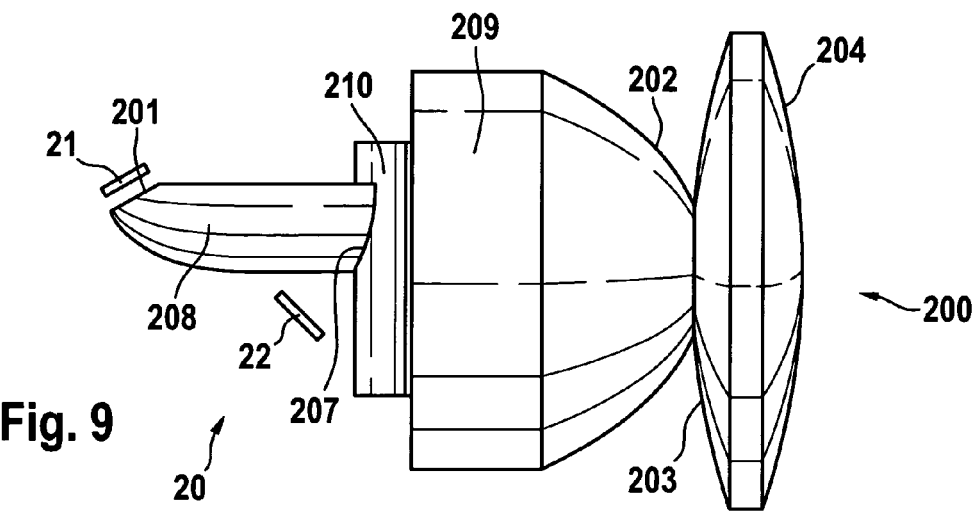
FIG. 9 shows a side view of an alternative example of embodiment of a motor vehicle headlight (for use in the motor vehicle according to FIG. 1)

FIG. 9 shows, by way of a side elevation, a motor vehicle headlight 20 to be used alternatively instead of motor vehicle headlight 10. The motor vehicle headlight 20 comprises a headlight lens 200. The headlight lens 200 comprises a light tunnel 208, which has a light entry face 201 on one side and, on the other side, forms transition into a light passage section 209 (of the headlight lens) via a bend 207 curved in the three spatial dimensions, which light passage section 209 includes a light exit face 202, a light entry face 203 as well as a further light exit face 204. The headlight lens 200 is configured such that light, which enters the headlight lens 200 through the light entry face 201, and from the light tunnel 208 enters the passage section in the region of the bend 207, will exit from the light exit face 204 essentially in parallel to the optical axis of the headlight lens 200. Herein, the light passage section 209 images the bend 207 as a bright-dark-boundary. A portion of the surface of the light passage section 209 designated by reference numeral 210 and facing the light tunnel 208 is configured as a Petzval surface.

The vehicle headlight 20 includes a light source 21 configured as an LED, and a light source 22 configured as an LED. By means of light source 21, and for the purpose of implementing dipped-beam headlight, light is irradiated into or made to enter, respectively, the light entry face 201 of the light tunnel 208. By means of the light source 22 selectively connectable for implementing sign light or high-beam headlight, light is made to enter or is irradiated, respectively, a bottom side of the light tunnel 208 or the portion 210 of the surface of the light passage section 209 facing the light tunnel 208, which portion 210 is configured as a Petzval face.

Figure 10:
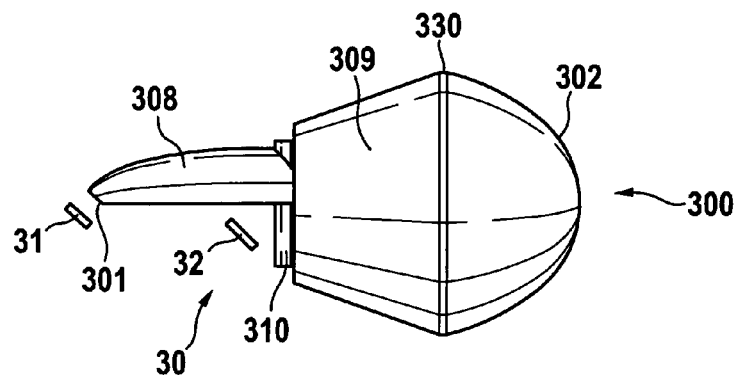
FIG. 10 shows a side view of a further alternative example of embodiment of a motor vehicle headlight (for use in the motor vehicle according to FIG. 1)
Figure 11:
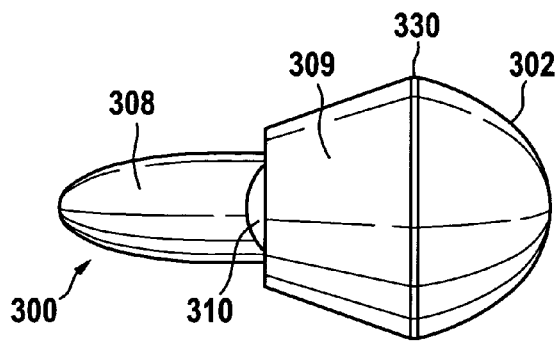
FIG. 11 shows an example of embodiment of a headlight lens of the motor vehicle headlight according to FIG. 10 by way of a top view.
Figure 12:
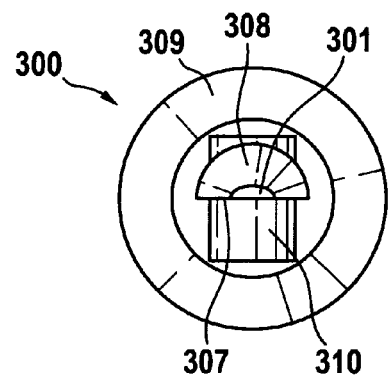
FIG. 12 shows the headlight lens according to FIG. 11 by way of a rear view.
Figure 13:
FIG. 13 shows a bright-dark-boundary generated by means of the motor vehicle headlight according to FIG. 10.

FIG. 10 shows a further motor vehicle headlight 30 by way of a side elevation and to be used alternatively with regard to motor vehicle headlight 10. The motor vehicle headlight 30 comprises a headlight lens 300. FIG. 11 shows the headlight lens 300 by way of a top view, and FIG. 12 shows the headlight lens 300 from the rear. The headlight lens 300 comprises a light tunnel 308, which has a light entry face 301 on one side and, on the other side, passes over into a light passage (conductive) section 309 (of the headlight lens) via a bend 307 curved in two spatial dimensions, which light passage section 309 includes a light exit face 302. The headlight lens 300 is configured such that light which enters the headlight lens 300 through the light entry face 301 and, from the light tunnel 308 enters the passage section in the region of the bend 307, will exit from the light exit face 302 essentially in parallel to the optical axis of the headlight lens 300. Herein, the light passage section 309 images the bend 307 as a light-dark boundary, just as it has been depicted in FIG. 13. The surface of the light passage section 309 facing the light tunnel 308 has a portion designated by reference numeral 310 and configured as a Petzval surface. A rim or edge, for example a circumferential edge, may be provided on the section (designated by reference numeral 330) of the surface of the passage section 309, by means of which edge the headlight lens 300 may be fixed in a for example appropriate manner.

The vehicle headlight 30 includes a light source 31 configured as an LED, and a light source 32 configured as an LED. By means of the light source 31, and for the purpose of implementing dipped-beam headlight, light is irradiated into or made to enter, respectively, the light entry face 301 of the light tunnel 308. By means of the light source 32 selectively connectable for implementing sign light or high-beam headlight, light is made to enter or is irradiated, respectively, into a bottom side of the light tunnel 308 or into the Petzval-surface—configured portion 310 of the surface of the light passage section 309 facing the light tunnel 308.

Figure 14:
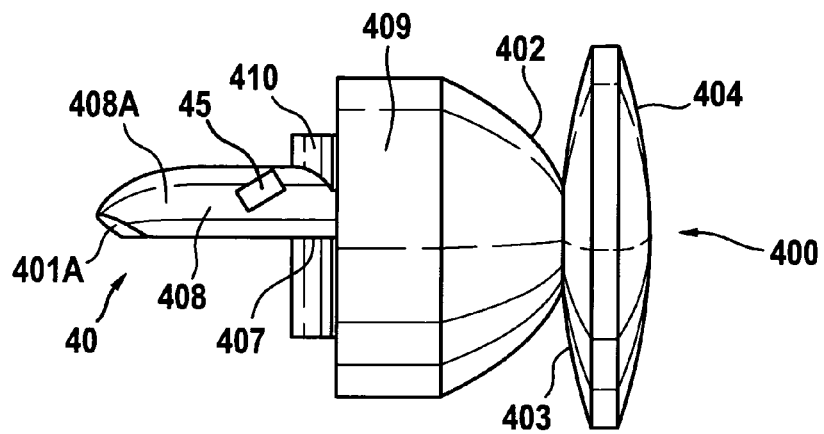
FIG. 14 shows a side view of a further alternative example of embodiment of a motor vehicle headlight (for use in the motor vehicle according to FIG. 1)
Figure 15:
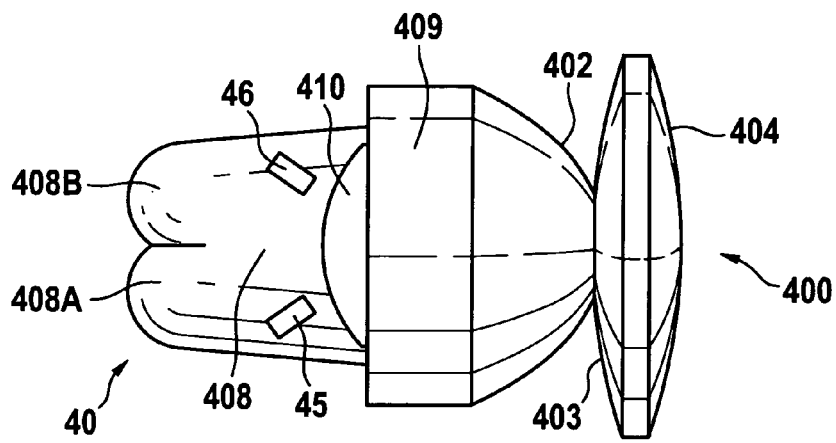
FIG. 15 shows the motor vehicle headlight according to FIG. 14 by way of a top view.
Figure 16:
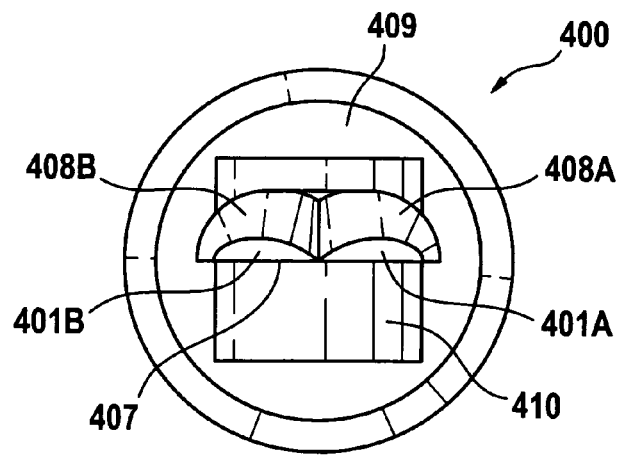
FIG. 16 shows an example of embodiment of the headlight lens of the motor vehicle headlight according to FIG. 14 by way of a rear view.

FIG. 14 shows a further motor vehicle headlight 40 by way of a side elevation and to be used alternatively with regard to motor vehicle headlight 10. The motor vehicle headlight 40 comprises a headlight lens 400. FIG. 15 shows the motor vehicle headlight 40 by way of a top view and FIG. 16 shows the headlight lens 400 from the rear. The headlight lens 400 comprises a light tunnel section 408A and a light tunnel section 408B, which open out in a light tunnel 408 which, in turn, passes over to a light passage section 409 (of the headlight lens) via a bend 407 curved in two spatial directions, which section 409 includes a light exit face 402, a light entry face 403 as well as a further light exit face 404. The light tunnel section 408A has a light entry face 401A, and the light tunnel section 408B includes a light entry face 401B. The headlight lens 400 is configured such that light, which enters the headlight lens 400 through the light entry faces 401A and 401B and, in the region of the bend 407 enters the passage section from the light tunnel 408 will exit from the light exit face 404 essentially in parallel to the optical axis of the headlight lens 400. Herein, the light passage section 409 images the bend 407 as a light-dark-boundary. A portion of the surface of the light passage section 409 designated by reference numeral 410 and facing the light tunnel 408 is configured as a Petzval surface.

Figure 17:
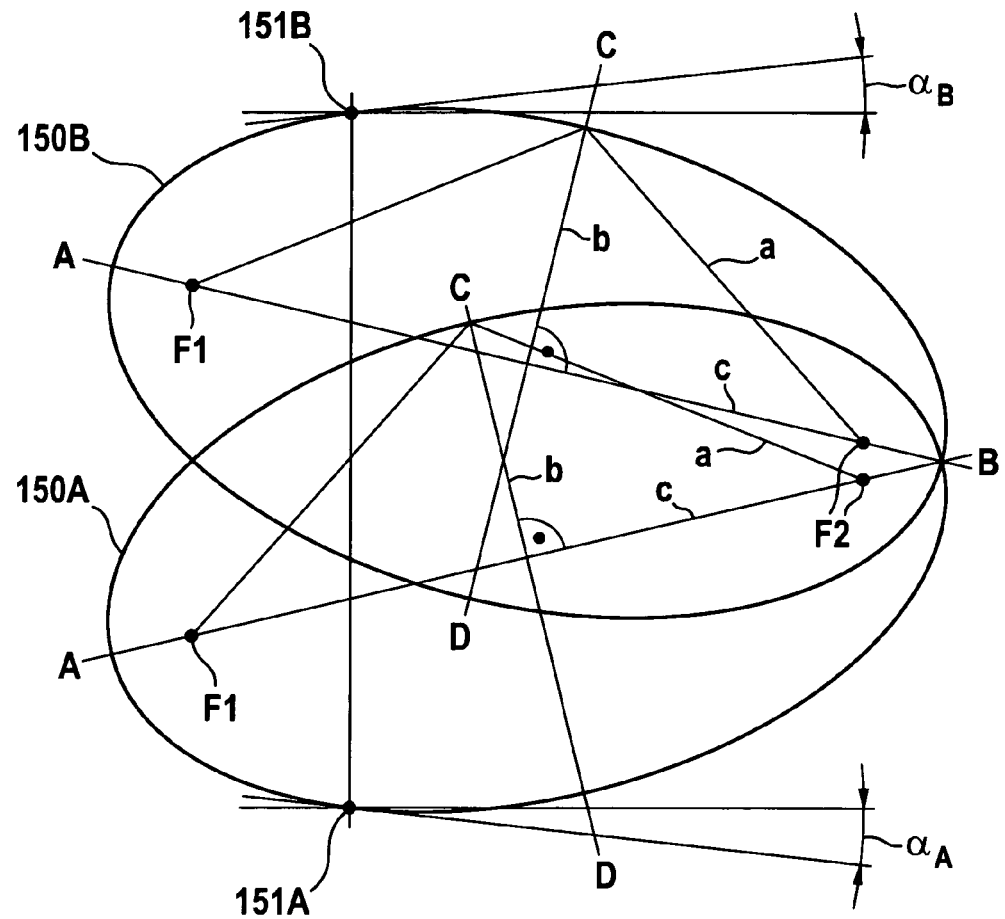
FIG. 17 shows a principle representation of an example of embodiment for the superimposition of two ellipsoids.

At least in their upper region, the light tunnel sections 408A and 408B are configured—taken in analogy to the explanations relating to FIG. 6—as part of an ellipsoid, as has been represented in principle in FIG. 17. Herein, reference numeral 150A designates an ellipsoid associated with the light tunnel section 408A, and reference numeral 150B designates an ellipsoid associated with the light tunnel section 408B. The ellipsoids 150A and 150B are—as has been represented in FIG. 17—aligned in relation to each other such that the respective focuses F2 will lie on top of each other. At the points designated by reference numerals 151A and 151B or starting at points 151A and 150B, respectively, (in the direction of light propagation or towards the right, respectively), the surface contour of the headlight lens 400 deviates from the contour of an ellipsoid. Herein, the angles $\alpha_A$ and $\alpha_B$ indicate the directions of deviation from the elliptic shape.

The motor vehicle headlight 40 includes two light sources, which, in analogy to light source 11 have been configured as LEDs and have not been depicted in FIG. 14 and FIG. 16 for the sake of clarity. By means of one of the light sources, and for the purpose of implementing dipped-beam headlight, light is irradiated into or made to enter, respectively, the light entry face 401A of the light tunnel section 408A, and by means of the other one of the light sources, and for the purpose of implementing dipped-beam headlight, light is irradiated into or made to enter, respectively, the light entry face 401B of the light tunnel section 408B. In addition, a not shown light source may be provided which corresponds to light source 12 with respect to position and performance.

In addition, and for implementing a corner light and/or a front fog light (adverse weather lamp) light sources 45 and 46 configured as LEDs are provided, with the light sources 45 and 46 being alternatively connectable for implementing the corner light. Herein, a not shown control is provided for within the motor vehicle 4, by means of which control light source 45 is switched on for the time of driving round a left corner, and light source 46 is switched on for the time of driving round a right corner. For implementing a front fog light, either light source 46, alone, or both light sources 45 and 46 are switched on.

Figure 18:
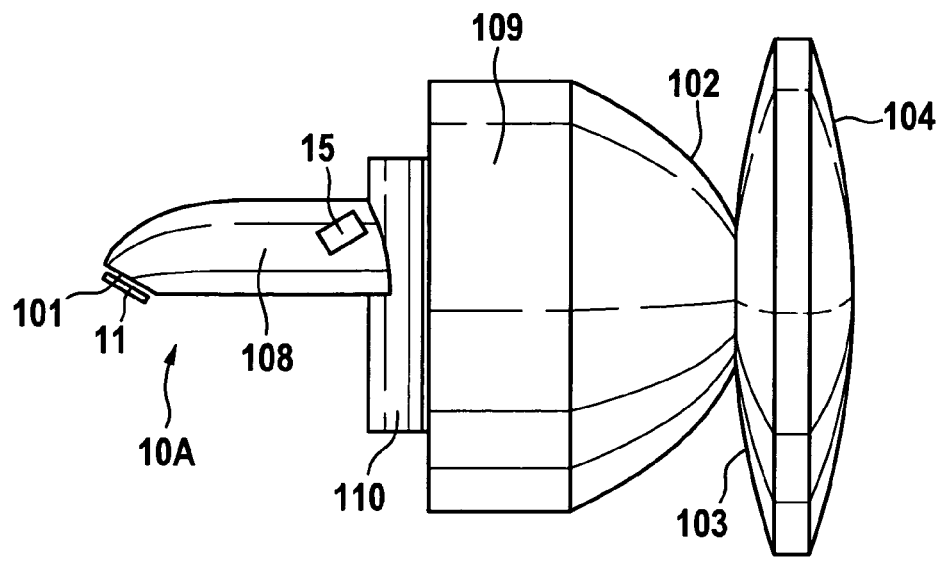
FIG. 18 shows a side view of a further example of embodiment of a motor vehicle headlight for use in the motor vehicle according to FIG. 1.
Figure 19:
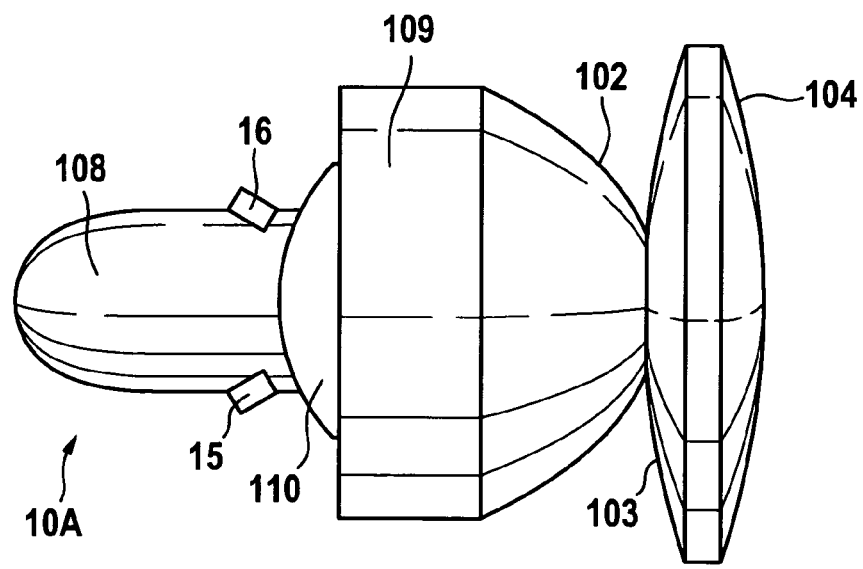
FIG. 19 shows the motor vehicle headlight according to FIG. 18 by way of a top view.

FIG. 18 and FIG. 19 show a motor vehicle headlight lens 10A to be used alternatively with regard to motor vehicle headlight 10. Herein, FIG. 18 shows the motor vehicle headlight lens 10A in a side elevation and FIG. 19 shows the motor vehicle headlight lens 10A in a top view. The motor vehicle headlight lens 10 A comprises the headlight lens 100 as well as the light source 11. In addition, for implementing a corner (or curve) light and/or a front fog light, light sources 15 and 16 configured as LED's have been provided. It may as well be provided for that, in addition, the light source 12 is implemented within the motor vehicle headlight 10A.

For implementing a corner light the light sources 15 and 16 may be switched on alternatively. In this context, a non-shown control is provided for in the motor vehicle 1, by means of which the light source 15 may be switched-on for the time of driving round a left corner and light source 16 may be switched on for the time of driving round a right corner. For implementing a front fog light either the light source 16, only, or both light sources 15 and 16 are switched-on.

Figure 20:
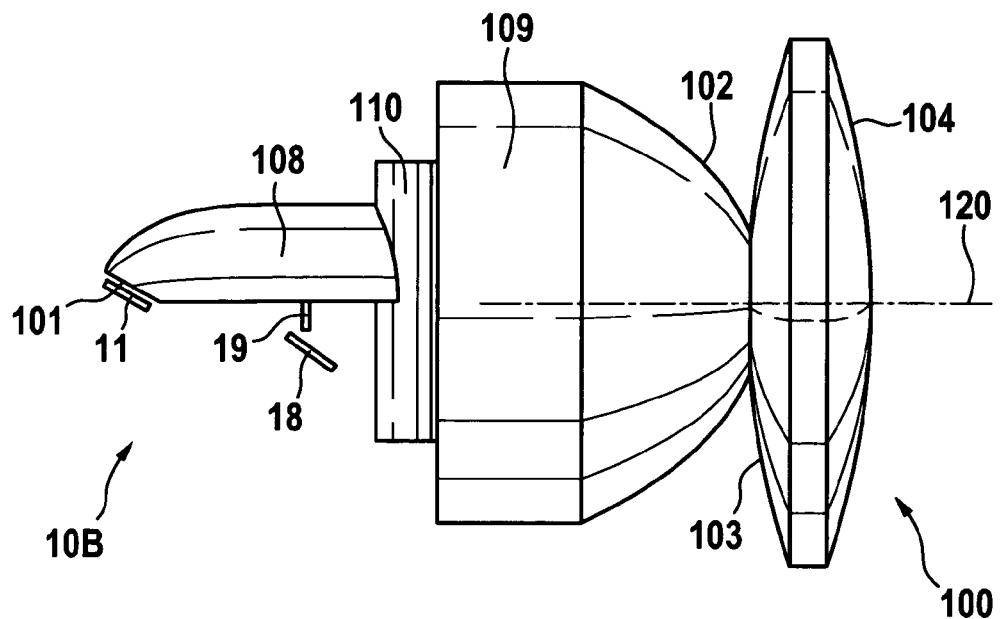
FIG. 20 shows a side view of a further example of an embodiment of a motor vehicle headlight for use in the motor vehicle according to FIG. 1.

FIG. 20 shows a motor vehicle headlight 10B (based on headlight lens 100) to be used alternatively with regard to motor vehicle headlight 10 and including a light source 18 for a drive light function configured as an LED and adapted to be connected, and a light source 19 configured as an LED for a sign light function, wherein the light output of the light source 18 is higher than that of light source 19.

Figure 21:
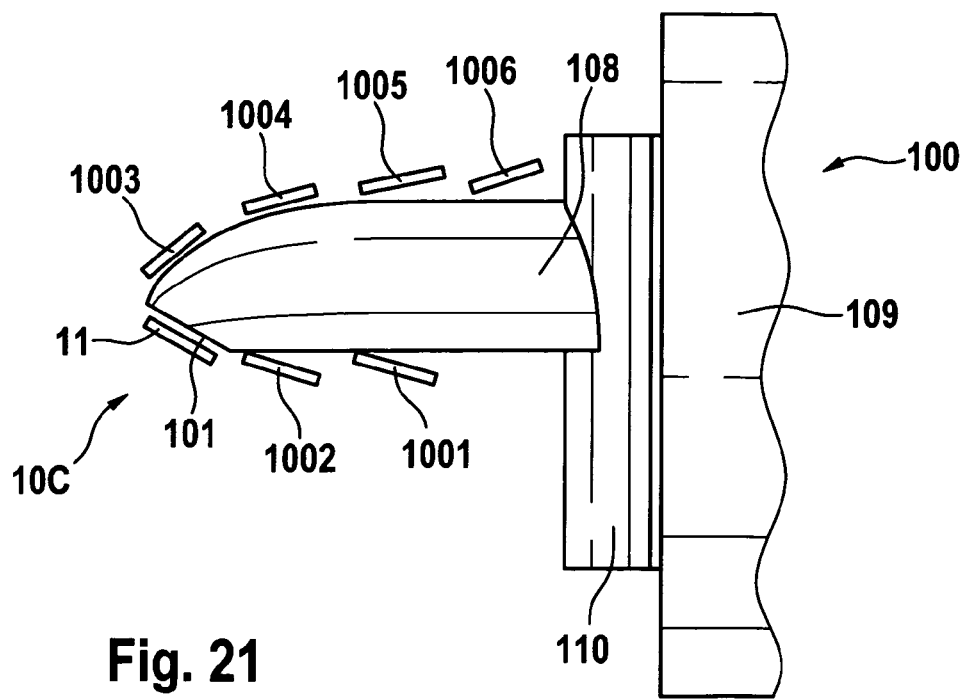
FIG. 21 shows a cut-out side elevation of a further example of embodiment of a motor vehicle headlight for use in the motor vehicle according to FIG. 1.

FIG. 21 shows a further motor vehicle headlight 10C based on headlight lens 100 and to be used alternatively instead of motor vehicle headlight 10. Herein, additional light sources 1001, 1002, 1003, 1004, 1005, 1006 are provided along the light tunnel 108. By means of this arrangement a higher light output may be achieved. The light sources 1003, 1004, 1005, 1006 or one or several of the light sources 1003, 1004, 1005, 1006 may be provided in context with the motor vehicle headlight 10B as well.

Figure 22:
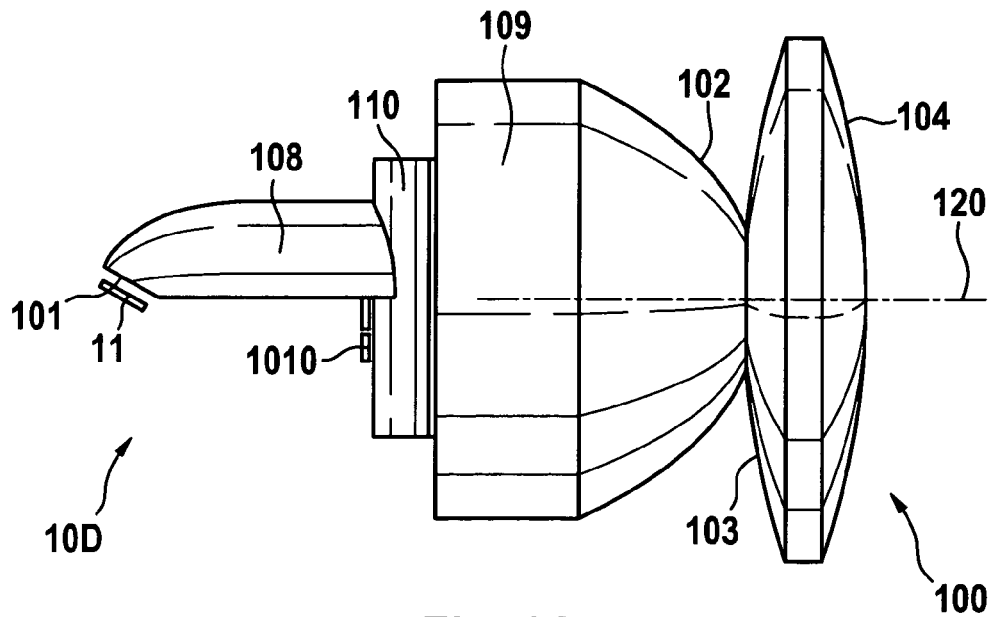
FIG. 22 shows a side elevation of a further example of embodiment of a motor vehicle headlight for use in the motor vehicle according to FIG. 1.
Figure 23:
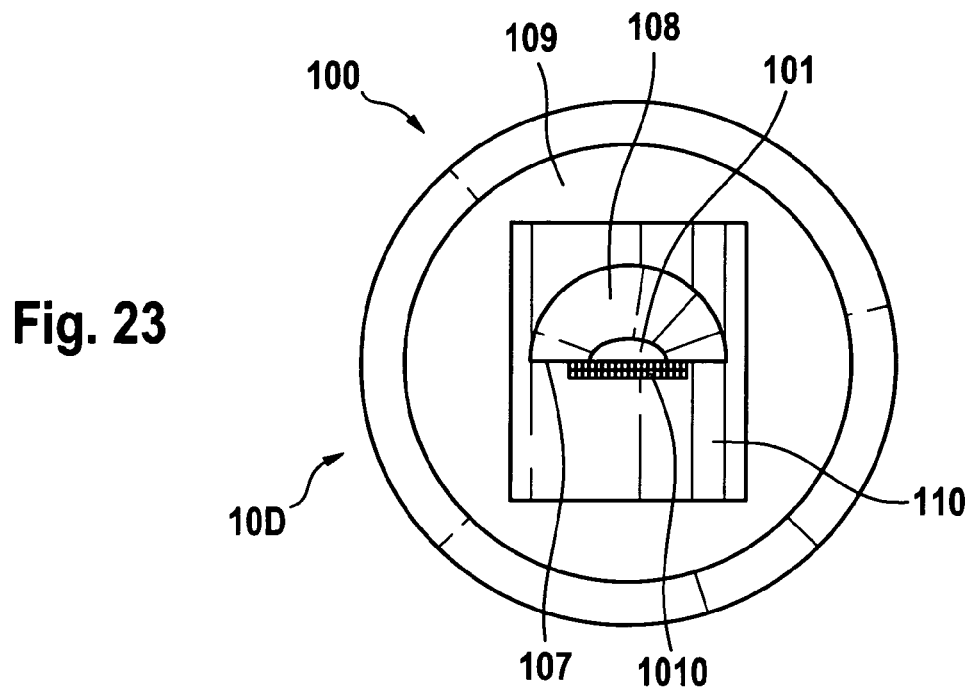
FIG. 23 shows a view from the rear of the motor vehicle headlight according to FIG. 22.

FIG. 22 shows a further motor vehicle headlight 10D based on headlight lens 100 and alternatively to be used instead of motor vehicle headlight 10. FIG. 23 shows the motor vehicle headlight 10D from the rear, however without the light source 11. Herein, by means of an LED array 1010 light is made to enter the Petzval-face-configured surface 110 of the passage section 109, the components of which array being adapted to be individually controlled or connected, respectively.

Figure 24:
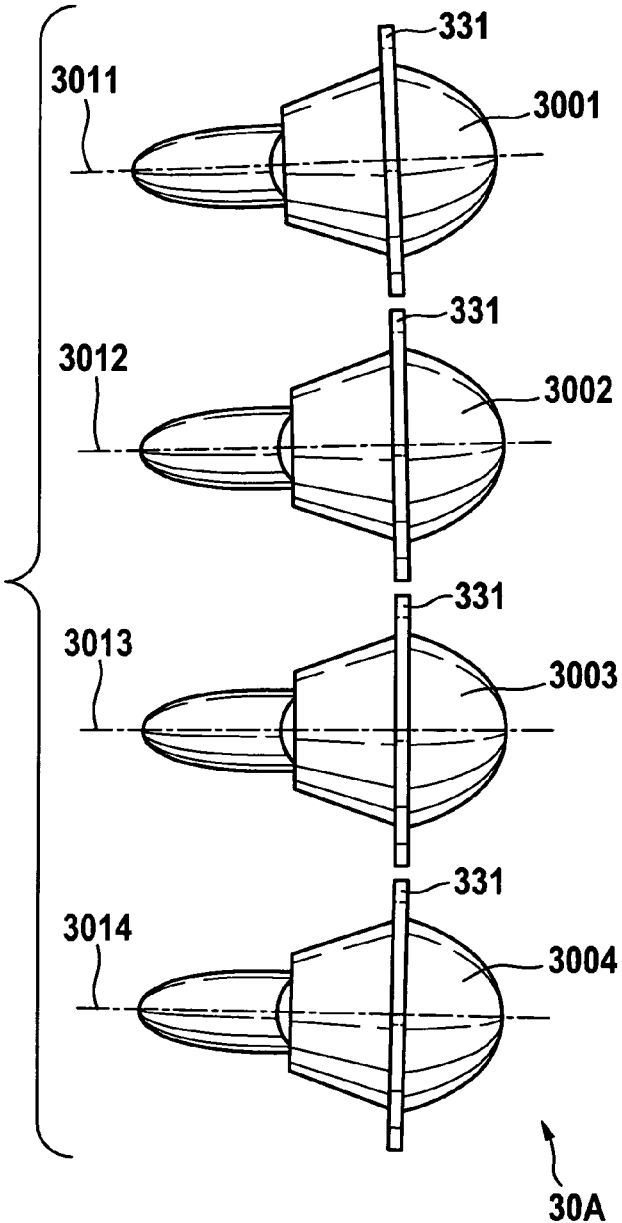
FIG. 24 shows a top view of a further example of embodiment of a motor vehicle headlight for use in the motor vehicle according to FIG. 1.

FIG. 24 shows a top view of an example of embodiment for an alternatively applicable motor vehicle headlight arrangement 30A. The motor vehicle headlight arrangement 30A has the partial headlights 3001, 3002, 3003, and 3004, which have headlight lenses configured in analogy to headlight lens 300, each, however, having a circumferential rim or edge 331 with differently configured bends, so that the bright-dark-boundary 3005 represented in FIG. 25 will be brought about. It may be provided for that the partial headlights 3001, 3002, 3003, and 3004 may have LED arrays corresponding to LED array 1010.

It may be provided for that instead of the partial headlight 3001 the motor vehicle headlight 10, the motor vehicle headlight 10A, the motor vehicle headlight 10B, the motor vehicle headlight 10C, the motor vehicle headlight 10D, the motor vehicle headlight 20 or the motor vehicle headlight 40 will be used, the associated bends corresponding to the bend of partial headlight 3001. It may be provided for that instead of the partial headlight 3002 the motor vehicle headlight 10, the motor vehicle headlight 10A, the motor vehicle headlight 10B, the motor vehicle headlight 10C, the motor vehicle headlight 10D, the motor vehicle headlight 20 or the motor vehicle headlight 40 will be used, the associated bends corresponding to the bend of partial headlight 3002. It may be provided for that instead of the partial headlight 3003 the motor vehicle headlight 10, the motor vehicle headlight 10A, the motor vehicle headlight 10B, the motor vehicle headlight 10C, the motor vehicle headlight 10D, the motor vehicle headlight 20, or the motor vehicle headlight 40 be used, the associated bends corresponding to the bend of partial headlight 3003. It may be provided for that instead of the partial headlight 3004 the motor vehicle headlight 10, the motor vehicle headlight 10A, the motor vehicle headlight 10B, the motor vehicle headlight 10C, the motor vehicle headlight 10D, the motor vehicle headlight 20 or the motor vehicle headlight 40 will be used, the associated bends corresponding to the bend of partial headlight 3004.

Figure 25:
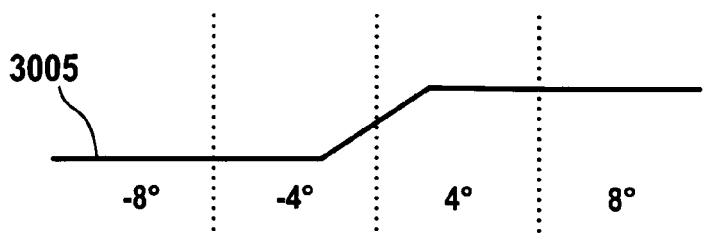
FIG. 25 shows a bright-dark-boundary generated by means of the motor vehicle headlight according to FIG. 24.

The optical axes 3011, 3012, 3013, and 3014 of the partial headlights 3001, 3002, 3003, and 3004, respectively, lie in a horizontal plane and are slightly inclined therein with respect to each other so that the partial headlight 3001 illuminates essentially the −8°-region, the partial headlight 3002 illuminates essentially the −4° region, the partial headlight 3003 illuminates essentially the 4° region and the partial headlight 3004 illuminates essentially the 8° region, respectively (cf. FIG. 25). It may be provided for that the partial headlights 3001, 3002, 3003, and 3004 be fixedly connected with each other within a module. It may be provided for that the partial headlights 3001, 3002, 3003, and 3004 are arranged in a mutual housing. It may also be provided for that the partial headlights 3001, 3002, 3003, and 3004 as well as further corresponding partial headlights are arranged along the circumference of a geometrical figure, for example along a circle.

Figure 26:
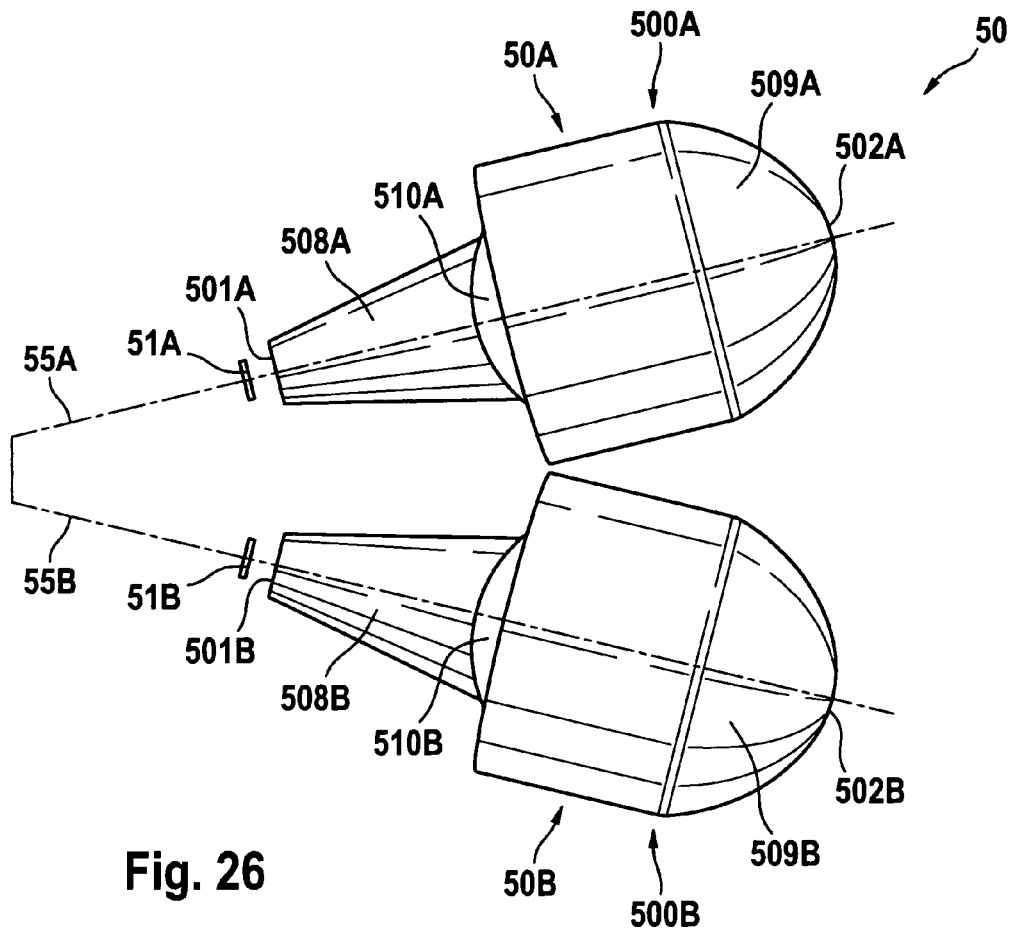
FIG. 26 shows a top view of an example of embodiment of a motor vehicle headlight array for use in the motor vehicle according to FIG. 1.
Figure 27:
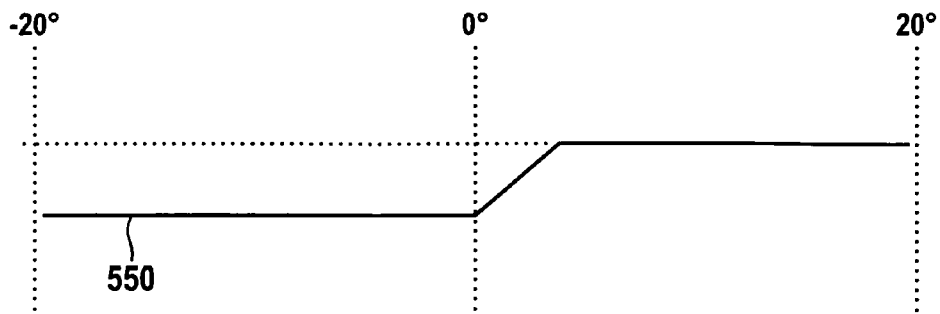
FIG. 27 shows a bright-dark-boundary generated by means of the motor vehicle headlight according to FIG. 24.

FIG. 26 shows a motor vehicle headlight arrangement 50 by way of a top view and to be used alternatively with regard to motor vehicle headlight 10. The motor vehicle headlight arrangement 50 includes partial headlights designated by reference numerals 50A and 50B. The partial headlight 50A comprises a headlight lens 500A. The headlight lens 500A comprises a light tunnel 508A, which has a light entry face 501A on one side and, on another side (on the bottom side of the headlight lens 500A), transits into a light passage or conductive section 509A (of the headlight lens) via a bend curved in two spatial dimensions, which light conductive section includes a light exit face 502A. The headlight lens 500A is configured such that light, which enters the headlight lens 500A through the light entry face 501A, and from the light tunnel 508A enters the passage section in the region of the bend, will exit from the light exit face 502A essentially in parallel to the optical axis 55A of the headlight lens 500A. Herein, the light passage section 509A images the bend as a bright-dark-boundary 550, as has been represented in FIG. 27. Herein the partial headlight 50A illuminates essentially the region between −20° and 0°. A portion of the surface of the light passage section 509A, which portion is facing the light tunnel 508A and has been designated by reference numeral 510A, is configured as a Petzval surface. The partial headlight 50A includes a light source 51A configured as an LED. For implementing a dipped-beam headlight, light is irradiated into or made to enter, respectively, the light entry face 501A of the light tunnel 508A by means of the light source 51A.

The partial headlight 50B comprises a headlight lens 500B. The headlight lens 500B comprises a blank-molded monolithic body made from inorganic glass and including a light tunnel 508B, which has a light entry face 501B on one side and, on another side (on the bottom side of the headlight lens 500B) forms transition into a light passage section 509B (of the headlight lens) via a bend curved in two spatial dimensions, which light passage section includes a light exit face 502B. The headlight lens 500B is configured such that light, which enters the headlight lens 500B through the light entry face 501B, and from the light tunnel 508B enters the passage section in the region of the bend, will exit from the light exit face 502B essentially in parallel to the optical axis 55B of the headlight lens 500B. Herein, the light passage section 509B images the bend as a bright-dark-boundary 550, as has been represented in FIG. 27. Herein the partial headlight 50A illuminates essentially the region between 0° and 20°. A portion of the surface of the light passage section 509B, which portion is facing the light tunnel 508B and has been designated by reference numeral 510B, is configured as a Petzval surface. The partial headlight 50B includes a light source 51B configured as an LED. For implementing dipped-beam headlight, light is irradiated into or made to enter, respectively, the light entry face 501B of the light tunnel 508B by means of the light source 51B. The optical axes 55A and 55B lie in one horizontal plane and, in this plane, are inclined by 25° with regard to each other.

Figure 28:
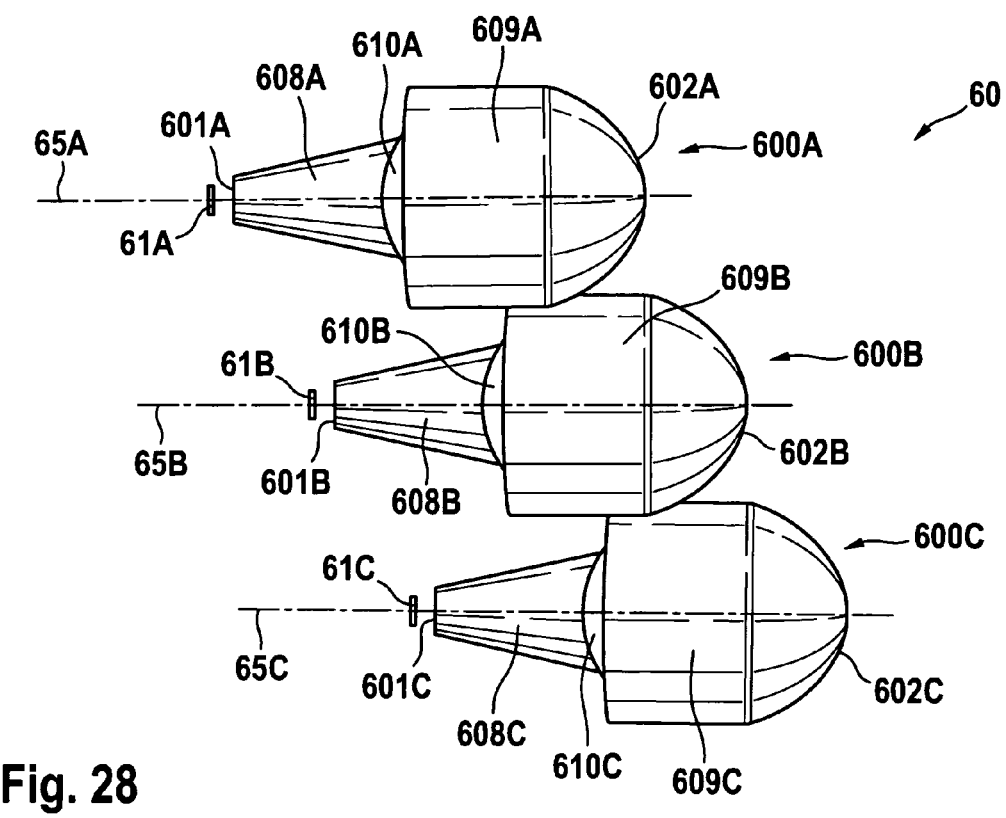
FIG. 28 shows a top view of a further example of embodiment of a motor vehicle headlight for use in the motor vehicle according to FIG. 1.

FIG. 28 shows, by way of a top view, a further motor vehicle headlight 60 alternatively to be used instead of motor vehicle headlight 10. The motor vehicle headlight 60 comprises a headlight lens 60 comprising a headlight lens part 600A, a headlight lens part 600B, and a headlight lens part 600C. The headlight lens part 600A comprises a light tunnel 608A, which has a light entry face 601A on one side and, on another side (on the bottom side of the headlight lens part 600A) forms transit into a light passage section 609A of the headlight lens part 600A via a bend curved in two spatial dimensions, which light passage section 609A includes a light exit face 602A. The headlight lens part 600A is configured such that light, which enters the headlight lens 600A through the light entry face 601A, and from the light tunnel 608A enters the passage section in the region of the bend, will exit from the light exit face 602A essentially in parallel to the optical axis 65A of the headlight lens part 600A. Herein, the light passage section 609A images the bend as a light-dark boundary. A portion of the surface of the light passage section 609A, which portion is facing the light tunnel 608A and has been designated by reference numeral 610A, is configured as a Petzval face. The motor vehicle headlight 60 includes a light source 61A configured as an LED, by means of which, for implementing dipped-beam headlight, light is irradiated into or made to enter, respectively, the light entry face 601A of the light tunnel 608A.

The headlight lens part 600B comprises a light tunnel 608B, which has a light entry face 601B on one side and, on another side (on the bottom side of the headlight lens part 600B), forms transit into a light passage or conductive section 609B of the headlight lens part 600B via a bend curved in two spatial dimensions, which light conductive section 609B includes a light exit face 602B. The headlight lens part 600B is configured such that light, which enters the headlight lens 600B through the light entry face 601B, and, in the region of the bend, from the light tunnel 608B enters the passage section will exit from the light exit face 602B essentially in parallel to the optical axis 65B of the headlight lens part 600B. Herein, the light passage section 609B images the bend as a light-dark-boundary. A portion of the surface of the light passage section 609B, which portion is facing the light tunnel 608B and has been designated by reference numeral 610A, is configured as a Petzval surface. The motor vehicle headlight 60 includes a light source 61B configured as an LED, by means of which, for implementing dipped-beam headlight, light is irradiated into or made to enter, respectively, the light entry face 601B of the light tunnel 608B.

The headlight lens part 600C comprises a light tunnel 608C, which has a light entry face 601C on one side and, on another side (on the bottom side of the headlight lens part 600C), transits into a light passage section 609C of the headlight lens part 600C via a bend curved in two spatial dimensions, which light passage section 609C includes a light exit face 602C. The headlight lens part 600C is configured such that light, which enters the headlight lens 600C through the light entry face 601C, and, in the region of the bend, from the light tunnel 608C enters the passage section will exit from the light exit face 602C essentially in parallel to the optical axis 65C of the headlight lens part 600C. Herein, the light passage section 609C maps the bend as a light-dark boundary. A portion of the surface of the light passage section 609C, which portion is facing the light tunnel 608C and has been designated by reference numeral 610C, is configured as a Petzval surface. The motor vehicle headlight 60 includes a light source 61C configured as an LED, by means of which, for implementing dipped-beam headlight, light is irradiated into or made to enter, respectively, the light entry face 601C of the light tunnel 608C.

The optical axis 65A lies in a first plane which is essentially horizontal. The optical axis 65B lies in a second essentially horizontal plane. The optical axis 65C lies in a third essentially horizontal plane. The first plane, the second plane, and the third plane extend essentially in parallel to each other. The optical axis 65A, moreover, lies in a first vertical plane. The optical axis 65B, moreover, lies in a second vertical plane. The optical axis 65C, moreover, lies in a third vertical plane. The first vertical plane is inclined by 0.5° with respect to the second vertical plane. The first vertical plane is inclined by 1° with respect to the third vertical plane. The second vertical plane is inclined by 0.5° with respect to the third vertical plane.

Figure 29:
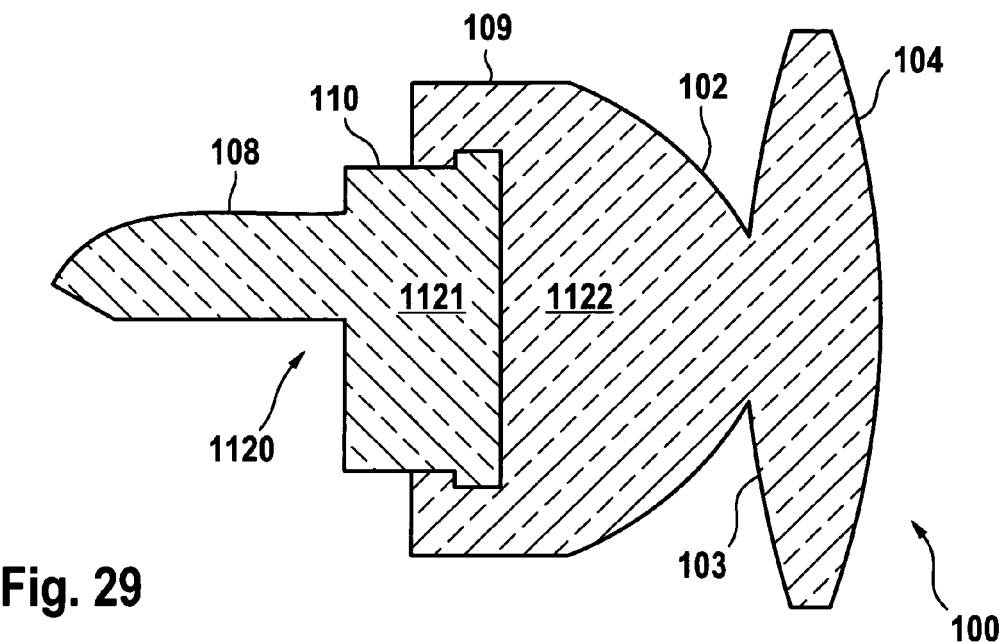
FIG. 29 shows a cross-sectional side view of the headlight lens according to FIG. 2.

FIG. 29 shows the headlight lens according to FIG. 2 by way of a lateral cross sectional elevation. The headlight lens 100 comprises a blank-molded monolithic body 1120 (=glass part) of inorganic glass, for example glass, which comprises 0.2 to 2% by weight $Al_2O_3$,
0.1 to 1% by weight $Li_2O$,
0.3 (in particular 0.4) to 1.5% by weight $Sb_2O_3$,
60 to 75% by weight $SiO_2$,
3 to 12% by weight $Na_2O$,
3 to 12% by weight $K_2O$, and
3 to 12% by weight CaO.

The blank-molded monolithic body 1120 comprises the light tunnel 108, as well as a partial light passage section 1121. The partial light passage section 1121 is partially injection molded-around by transparent plastic material for molding a further partial light passage section 1122. The partial light passage section 1121 and the partial light passage section 1122 form the light passage section 109.

The transparent plastic material is, for example, Makrolon LED2045 or, respectively, a thermoplastic resin such as e.g. a polycarbonate resin, a polyacrylic resin or a modified polyolefin resin. Examples of appropriate thermoplastic plastic material or thermoplastic resin may be taken, for example, from DE 699 23 847 T2. As a polycarbonate resin, DE 699 23 847 T2 consequently discloses the appropriate use of aromatic polycarbonate resin which has been obtained by processing a diphenol and a carbonate precursor. In this context, examples of the diphenol include bis-(hydroxylaryl)-alkanes such as 2,2-bis-(4-hydroxyphenyl)-propane (so-called bisphenol A), bis-(4-hydroxyphenyl)-methane, 1,1-bis-(4-hydroxyphenyl)-ethane, 2,2-bis-(4-hydroxyphenyl)-butane, 2,2-bis-(4-hydroxyphenyl)-octane, 2,2-bis-(4-hydroxyphenyl)-phenylmethane, 2,2-bis-(4-hydroxy-3-methylphenyl)-propane, 1,1-bis-(4-hydroxy-3-tert-butylphenyl)-propane, 2,2-bis-(4-hydroxy-3-bromophenyl)-propane, 2,2-bis-(4-hydroxy-3,5-dibromophenyl)-propane and 2,2-bis-(4-hydroxy-3,5-dichlorophenyl)-propane; bis-(hydroxyphenyl)-cycloalkane such as 1,1-bis-(hydroxyphenyl)-cyclopentane and 1,1-bis-(hydroxyphenyl)-cyclohexane; dihydroxyarylethers such as 4,4'-dihydroxydiphenylether and 4,4'-dihydroxy-3,3'-dimethyldiphenylether; dihydrodiarylsulfides such as 4,4'-dihydroxydiphenylsulfide and 4,4'-dihydroxy-3,3'-dimethyldiphenylsulfide; Dihydroxydiarylsulfoxides such as 4,4'-dihydroxydiphenylsulfoxide and 4,4'-dihydroxy-3,3'-dimethyldiphenylsulfoxide; and dihydroxydiarylsulfones such as 4,4'-dihydroxydiphenylsulfone and 4,4'-dihydroxy-3,3'-dimethyldiphenylsulfone. These diphenols may be used per se or by way of a combination of two or more products.

Figure 30:
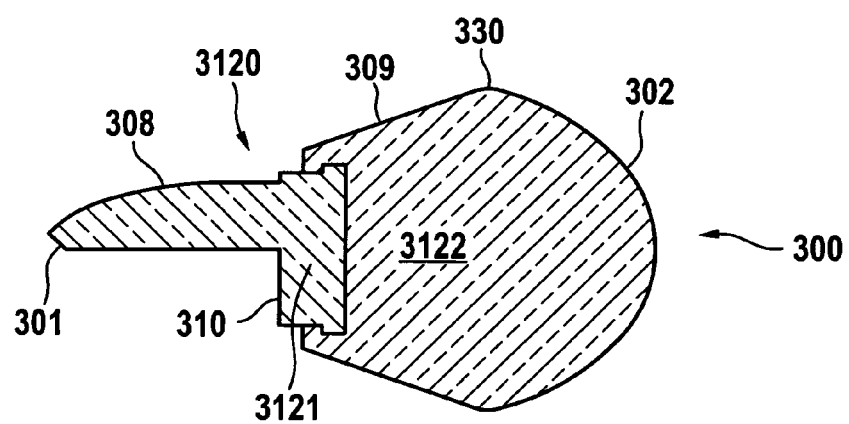
FIG. 30 shows a cross-sectional side view of the headlight lens according to FIG. 10.

The headlight lenses 200. 300, 400, 500A, 500B, as well as the headlight lenses of the partial headlights 3001. 3002, 3003, and 3004 are configured in an analogue manner regarding headlight lens 100, as has been represented, in a purely exemplary manner, in the example of headlight lens 300 of FIG. 30. Herein, FIG. 30 shows the headlight lens 300 by way of a lateral cross-sectional view. The headlight lens 300 comprises a blank-molded monolithic body 3120 (=glass part) of inorganic glass. The blank-molded monolithic body 3120 comprises the light tunnel 308, as well as a partial light passage section 3121. The partial light passage section 3121 is partially injection molded-around by transparent plastic material for molding a further partial light passage section 3122. The partial light passage section 3121 and the partial light passage section 3122 form the light passage section 309.

Figure 31:
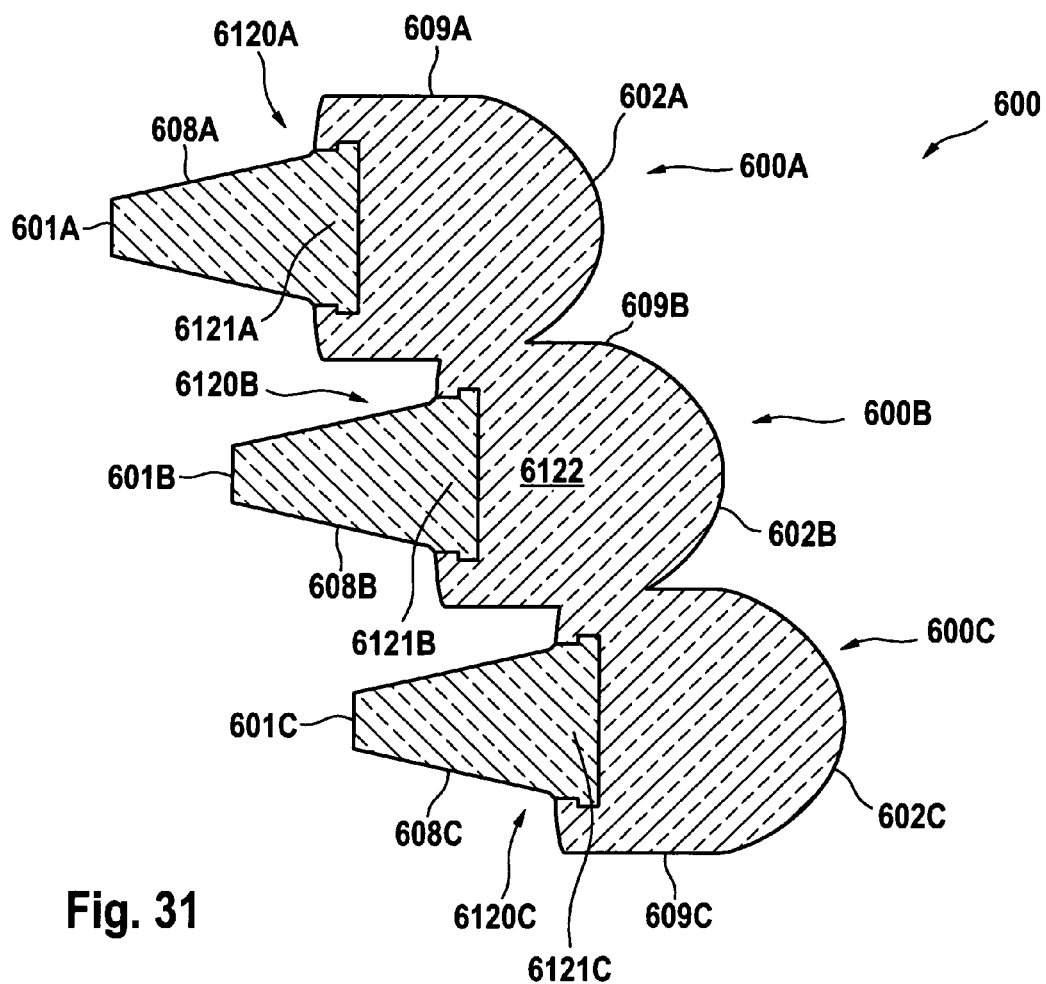
FIG. 31 shows a cross-sectional top view of the headlight lens according to FIG. 28.

The headlight lens 600 is—as has been represented in FIG. 31—also configured in an analogue manner. Herein, FIG. 31 shows a cross section of the headlight lens 600 by way of a top view. The headlight lens 600 comprises a blank-molded monolithic body 6120A (=glass part) made from inorganic glass, a blank-molded monolithic body 6120B (=glass part) made from inorganic glass, and a blank-molded monolithic body 6120C (=glass part) made from inorganic glass. The blank-molded monolithic body 6120A comprises the light tunnel 608A as well as a partial light passage section 6121A. The partial light passage section 6121A has been partially injection molded-around by transparent plastic material for forming a further partial light passage section 6122. The blank-molded monolithic body 6120B comprises the light tunnel 608B as well as a partial light passage section 6121B. The partial light passage section 6121B has been partially injection molded-around by transparent plastic material for forming the partial light passage section 6122. The blank-molded monolithic body 6120C comprises the light tunnel 608C as well as a partial light passage section 6121C. The partial light passage section 6121C has been partially injection molded-around by transparent plastic for forming a further partial light passage section 6122. The partial light passage section 6121A and the partial light passage section 6122 together form the light passage section 609A. The partial light passage section 6121B and the partial light passage section 6122B together form the light passage section 609B. The partial light passage section 6121C and the partial light passage section 6122 together form the light passage section 609C.

Figure 32:
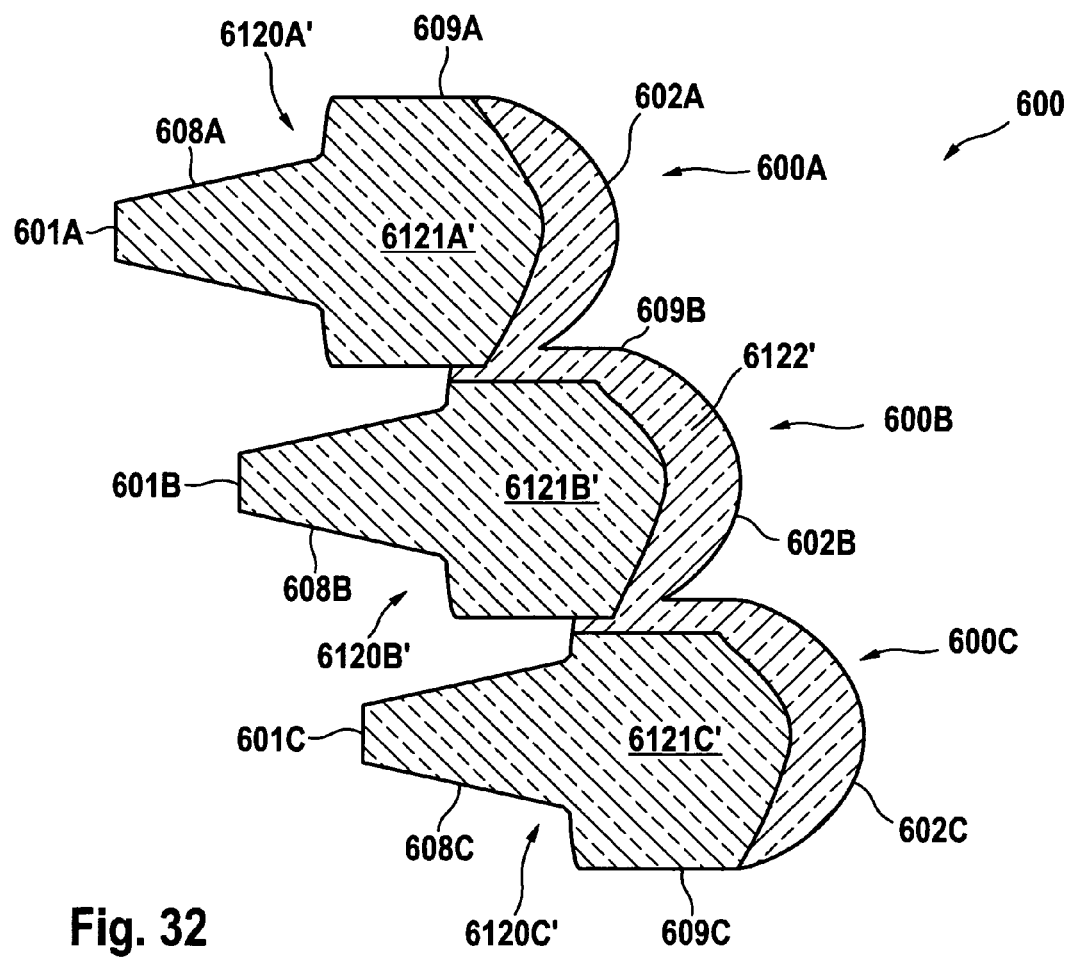
FIG. 32 shows a cross-sectional top view of an alternative embodiment of the headlight lens according to FIG. 28.

The headlight lens 600 may also be configured as has been represented in FIG. 32. Herein, FIG. 32 shows a cross section of the headlight lens 600 by way of a top view.

The headlight lens 600 comprises a blank-molded monolithic body 6120A' (=glass part) from inorganic glass, a blank-molded monolithic body 6120B' (=glass part) from inorganic glass, and a blank-molded monolithic body 6120C' (=glass part) from inorganic glass. The blank-molded monolithic body 6120A' comprises the light tunnel 608A as well as a partial light passage section 6121A'. Transparent plastic material has been added-on by injection molding to the partial light passage section 6121A' for forming the partial light passage section 6122'. The blank-molded monolithic body 6120B comprises the light tunnel 608B as well as a partial light passage section 6121B'. The partial light passage section 6121B' has been partially injection molded-around by transparent plastic material for forming the partial light passage section 6122'. The blank-molded monolithic body 6120C comprises the light tunnel 608C as well as a partial light passage section 6121a. Transparent plastic has been added-on by injection-molding to the partial light passage section 6121C' for forming a the partial light passage section 6122'. The partial light passage section 6121A' and the partial light passage section 6122' form the light passage section 609A. The partial light passage section 6121B' and the partial light passage section 6122' form the light passage section 609B. The partial light passage section 6121a and the partial light passage section 6122' form the light passage section 609C.

The elements, distances and angles in the figures have been drawn in consideration of simplicity and clearness and not necessarily to scale. For example, the orders of magnitude of some elements, distances and angles have been exaggerated with respect to other elements, distances and angles in order to improve comprehension of the examples of embodiment of the present invention.

The invention claimed is:

1. Headlight lens for a vehicle headlight, the headlight lens comprising:
    a light passage section, the light passage section comprising
        a first partial light passage section; and
        a second partial light passage section from transparent plastic material, wherein the second partial light passage section at least partially encloses the first partial light passage section; and
    a light tunnel, which light tunnel, via a bend, transits into the first partial light passage section, wherein the light tunnel includes at least one light entry face, and wherein the light tunnel and the first partial light passage section form a monolithic glass body;
    wherein the light passage section is configured for imaging the bend as a bright-dark-boundary.

2. Headlight lens as claimed in claim 1, wherein the first partial light passage section is not enclosed by the second partial light passage section in the area of the bend.

3. Headlight lens as claimed in claim 1, wherein the glass body on its surface comprises a concentration of aluminium, which is larger than a concentration of aluminium in the interior of the glass body.

4. Headlight lens as claimed in claim 1, wherein the glass body on its surface comprises a concentration of sodium which is smaller than a concentration of sodium in the interior of the glass body.

5. Headlight lens as claimed in claim 2, wherein the first partial light passage section includes a bulge embedded in the second partial light passage section.

6. Headlight lens as claimed in claim 2, wherein the light entry face is inclined with respect to an optical axis of the light passage section by an angle of between 5° and 70°, and wherein the light tunnel comprises a region on its surface which corresponds essentially to a part of the surface of an ellipsoid.

7. Headlight lens as claimed in claim 1, the bend being a curved transition having a radius of curvature of no less than 50 nm and no larger than 5 mm.

8. Headlight lens for a vehicle headlight, the headlight lens comprising:
   a light passage section, the light passage section comprising
      a first partial light passage section; and
      a second partial light passage section from transparent plastic material, wherein the second partial light passage section is fixedly connected to the first partial light passage section; and
   a light tunnel, which light tunnel, via a bend, transits into the first partial light passage section, wherein the light tunnel includes at least one light entry face, and wherein the light tunnel and the first partial light passage section form a monolithic glass body;
   wherein the light passage section is configured for imaging the bend as a bright-dark-boundary.

9. Headlight lens as claimed in claim 8, wherein the glass body has a coating comprising a concentration of aluminium, which is larger than a concentration of aluminium in the interior of the glass body.

10. Headlight lens as claimed in claim 8, wherein the glass body has a coating comprising a concentration of sodium which is smaller than a concentration of sodium in the interior of the glass body.

11. Headlight lens as claimed in claim 8, wherein the light entry face is inclined with respect to an optical axis of the light passage section by an angle of between 5° and 70°, and wherein the light tunnel comprises a region on its surface which corresponds essentially to a part of the surface of an ellipsoid.

12. Headlight lens as claimed in claim 8, the bend being a curved transition having a radius of curvature of no less than 0.05 mm.

13. Headlight lens as claimed in claim 12, the bend being a curved transition having a radius of curvature of no larger than 5 mm.

14. Headlight lens as claimed in claim 8, the bend being a curved transition having a radius of curvature of no larger than 5 mm.

15. Headlight lens as claimed in claim 9, wherein the glass body has a coating comprising a concentration of sodium which is smaller than a concentration of sodium in the interior of the glass body.

16. Headlight lens for a vehicle headlight, the headlight lens comprising:
   a light passage section, the light passage section comprising
      a first partial light passage section;
      a second partial light passage section; and
      a third partial light passage section from transparent plastic material, wherein the third partial light passage section at least partially encloses the first partial light passage section, and wherein the third partial light passage section at least partially encloses the second partial light passage section;
   a first light tunnel, which first light tunnel, via a first bend, transits into the first partial light passage section, wherein the first light tunnel and the first partial light passage section form a first monolithic glass body; and
   a second light tunnel, which second light tunnel, via a second bend, transits into the second partial light passage section, wherein the second light tunnel and the second partial light passage section of the light passage section form a second monolithic glass body;
   wherein the light passage section is configured for imaging the first bend as a bright-dark-boundary; and
   wherein the light passage section is configured for imaging the second bend as a bright-dark-boundary.

17. Headlight lens as claimed in claim 16, wherein the first partial light passage section is not enclosed by the third partial light passage section in the area of the first bend.

18. Headlight lens as claimed in claim 17, wherein the second partial light passage section is not enclosed by the third partial light passage section in the area of the second bend.

19. Headlight lens as claimed in claim 16, wherein the first glass body has a coating comprising a concentration of aluminium, which is larger than a concentration of aluminium in the interior of the first glass body.

20. Headlight lens as claimed in claim 16, wherein the first glass body has a coating comprising a concentration of sodium which is smaller than a concentration of sodium in the interior of the first glass body.

21. Headlight lens as claimed in claim 16, wherein the first partial light passage section includes a bulge embedded in the third partial light passage section.

22. Headlight lens as claimed in claim 21, wherein the second partial light passage section includes a bulge embedded in the third partial light passage section.

23. Headlight lens as claimed in claim 16, the first bend being a curved transition and the second bend being a curved transition.

24. Headlight lens as claimed in claim 16, the first bend being a curved transition having a radius of curvature of no less than 0.05 mm and no larger than 5 mm and the second bend being a curved transition having a radius of curvature of no less than 0.05 mm and no larger than 5 mm.

* * * * *